US012718103B2

(12) United States Patent

Arora et al.

(10) Patent No.: US 12,718,103 B2
(45) Date of Patent: Aug. 25, 2026

(54) AUTOMATIC ONTOLOGY GENERATION BY EMBEDDING REPRESENTATIONS

(71) Applicant: Mercari, Inc., Palo Alto, CA (US)

(72) Inventors: Sho Arora, Palo Alto, CA (US); Jeffrey Kenichiro Hara, Santa Clara, CA (US); Sahil Rishi, San Jose, CA (US); Yu Ishikawa, San Francisco, CA (US); Shotaro Kohama, Palo Alto, CA (US); Lu Sun, Palo Alto, CA (US); Vishal Kashyap, Tokyo (JP); Mohammad-Mahdi Moazzami, San Jose, CA (US)

(73) Assignee: MERCARI, INC., Palo Alto, CA (US)

( * ) Notice: Subject to any disclaimer, the term of this patent is extended or adjusted under 35 U.S.C. 154(b) by 1038 days.

(21) Appl. No.: 17/531,985

(22) Filed: Nov. 22, 2021

(65) Prior Publication Data

US 2022/0172065 A1 Jun. 2, 2022

Related U.S. Application Data

(60) Provisional application No. 63/119,353, filed on Nov. 30, 2020.

(51) Int. Cl.
*G06N 3/084* (2023.01)
*G06Q 10/087* (2023.01)

(52) U.S. Cl.
CPC ........... *G06N 3/084* (2013.01); *G06Q 10/087* (2013.01)

(58) Field of Classification Search
CPC ...... G06N 3/084; G06N 3/045; G06N 3/0464; G06N 3/09; G06Q 10/087
See application file for complete search history.

(56) References Cited

U.S. PATENT DOCUMENTS 9,990,558 B2 6/2018 Lin et al.
11,907,337 B2 * 2/2024 Fuxman ................ G06V 10/82
(Continued)

FOREIGN PATENT DOCUMENTS

DE 102017113232 A1 * 12/2017 ............ G06F 17/16
WO WO-2019084189 A1 * 5/2019 ............ G06N 20/00
WO WO-2020/228525 A1 11/2020

OTHER PUBLICATIONS

Vrochidis, Moumtzidou, et al., "A Multimodal Analytics Platform for Journalists Analyzing Large-Scale, Heterogeneous Multilingual, and Multimedia Content", Frontiers in Robotics and AI, 2018, vol. 5, doi:10.3389/frobt.2018.00123 (Year: 2018).*
(Continued)

*Primary Examiner* — Ann J Lo
(74) *Attorney, Agent, or Firm* — Sterne, Kessler, Goldstein & Fox P.L.L.C.

(57) ABSTRACT

Disclosed herein are system, computer-readable storage medium, and method embodiments of automatic ontology generation by embedding representations. A system including at least one processor may be configured to receive a vectorized feature set derived from an embedding and including first and second features, and provide the vectorized feature set to a fuser set including first and second fusers. The system may be configured to generate a representation from the fuser set based on the first and second features, and derive tasks based on the representation, assigning to the tasks respective qualifier sets including a weight value, a loss function, and a feedforward function. The system may be configured to compute respective weighted losses for the tasks, based on the respective qualifier sets, and output a data model based on backpropagating the respective weighted losses through the fuser set,
(Continued)

the vectorized feature set, the embedding, or a combination thereof.

20 Claims, 23 Drawing Sheets

(56) References Cited

U.S. PATENT DOCUMENTS

| | | | | |
|---|---|---|---|---|
| 2014/0344270 | A1* | 11/2014 | Lambert | G06F 16/285 707/737 |
| 2016/0078361 | A1 | 3/2016 | Brueckner et al. | |
| 2019/0286754 | A1* | 9/2019 | Leskovec | G06F 18/2148 |
| 2020/0104631 | A1 | 4/2020 | Zhang et al. | |
| 2020/0134428 | A1 | 4/2020 | Cheng et al. | |

OTHER PUBLICATIONS

Michael Crawshaw, "Multi-Task Learning with Deep Neural Networks: A Survey", Sep. 10, 2020, George Mason University (Year: 2020).*

Baltrusaitis et al., "Multimodal Machine Learning: A Survey and Taxonomy", Aug. 1, 2017, https://arxiv.org/abs/1705.09406 (Year: 2017).*

Pushparaja Murugan, "Feed Forward and Backward Run in Deep Convolutional Neural Network", Nov. 9, 2017, https://arxiv.org/abs/1711.03278 (Year: 2017).*

K.-L. Du, "Clustering: A neural network approach", 2010, vol. 23, Issue 1, pp. 89-107, https://doi.org/10.1016/j.neunet.2009.08.007. (Year: 2010).*

Li, X., Lei, L., Sun, Y., Li, M., & Kuang, G. (2020). Collaborative attention-based heterogeneous gated fusion network for land cover classification. IEEE Transactions on Geoscience and Remote Sensing, 59(5), 3829-3845. (Year: 2020).*

Misra, I., Shrivastava, A., Gupta, A., & Hebert, M. (2016). Cross-stitch networks for multi-task learning. In Proceedings of the IEEE conference on computer vision and pattern recognition (pp. 3994-4003). (Year: 2016).*

Crawshaw, M. (2020). Multi-task learning with deep neural networks: A survey. arXiv preprint arXiv:2009.09796. (Year: 2020).*

Rayatdoost, S., Rudrauf, D., & Soleymani, M. (Oct. 2020). Multimodal gated information fusion for emotion recognition from EEG signals and facial behaviors. In Proceedings of the 2020 International Conference on Multimodal Interaction (pp. 655-659). (Year: 2020).*

International Search Report and Written Opinion for International Patent Application No. PCT/US2021/061187, dated Mar. 29, 2022, 9 pages.

* cited by examiner

600A

600B

800

| Item ID | Image | Brand ID | L2 ID |
|---|---|---|---|
| m123 | m123.jpg | 13 | 48 |
| m234 | m234.jpg | 25 | 93 |
| m345 | m345.jpg | 13 | 285 |

preprocessing
reindexing
transforming

| image ID | Image | Brand ID | L2 ID | Tags |
|---|---|---|---|---|
| m123 | m123.jpg | 0 | 0 | [B, I, O] |
| m234 | m234.jpg | 1 | 1 | [B, O] |
| m345 | m345.jpg | 0 | 2 | [B, O] |

```
feature_specs:
  -
    name: title_embedding
    columns: [ ' name ' , 'name2 '
    embeddings:
        word_embedding_1: glove
        flair_forward: flair_fwd
        flair_backward: flair_bkwd
    encoder: transformer
    nhead: 9
    num_layers: 6
    reproject_words: true
    reproject_words_dimension: 512
    dropout: 0.2
    return_hidden: true
  -
    # may include more
```

```
fuser_specs:
    -
        name: title_sim_vector
        feats_to_fuse:
                - title_embedding/name
                - title_embedding/name2
        output_size: 256
        activation: ReLU
        dropout: 0.3
    -
        # may include more
```

```
task_specs:
    -
        name: title_sim
        type: regression
        input_name: title_sim_vector
        label_col: titles_are_same
        layers: [128, 32, 4]
        dropout: 0.2
    -
        # may include more
```

Model(s):

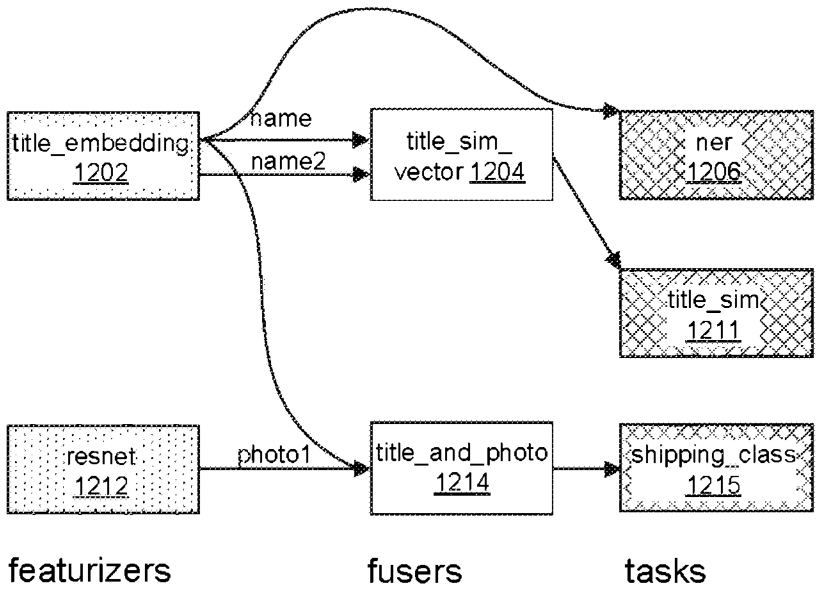

YAML Specifying Model(s):

1208

```
feature_specs:
 -
   name:    title_embedding
   columns: [ ' name ' , 'name2 ' ]
   embeddings:
        word_embedding_1: glove
   encoder: transformer
   reproject_words: true
   reproject_words_dimension: 512
   return_hidden: true
 -
   name: resnet
   encoder: img
   img_model: resnet50
   columns: [ 'name', 'name2']
   embedding_size: 4096
fuser_specs:
 - name: title_sim_vector
   feats_to_fuse: [title_embedding/name, title_embedding/name2]
   output_size: 256
   activation: ReLU
 - name: title_and_photo
   feats_to_fuse: [title_embedding/name, resnet/photo1]
   output_size: 512
   activation: ReLU
task_specs:
 -
   name: title_sim
   type: regression
   input_name: title_sim_vector
   label_col: titles_are_same
   layers: [ 128, 32, 4]
 -
   name: shipping_class
   type: classification
   input_name: title_embedding/name2
   label_col: tiered_actual_weight
   layers: [ 128, 16]
   activation: ReLU
 -
   name: ner
   type: tagging
   input_name: title_embedding/name/hidden
   label_col: tags
   layers: 256
```

AUTOMATIC ONTOLOGY GENERATION BY EMBEDDING REPRESENTATIONS

CROSS-REFERENCE TO RELATED APPLICATIONS

This application claims the benefit of U.S. Provisional Patent Application No. 63/119,353, titled "Automatic Ontology Generation by Embedding Representations" and filed Nov. 30, 2020, which is herein incorporated by reference in its entirety.

BACKGROUND

When selling a given item via an online platform, a user of the platform who wishes to sell the item may have difficulty with describing items, e.g., categorizing an item, describing attributes specific to the item, choosing a list price for the item, etc. Such problems may especially affect novice users who lack experience with selling items in general, or particularly even for other sellers who may be new to a given platform.

As a result of these problems, sellers may have difficulty finding buyers and closing sales in a timely manner. As a further result of these problems, buyers on an online platform may have difficulty in finding desired items when the buyers use text searching or similar information-retrieval tools to search for items to buy. Accordingly, there is a need to clarify attributes of items that text descriptions represent.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIG. 8 depicts example dataframes before and after various transformations, including preprocessing and reindexing, by at least one dataset generator, according to some embodiments.

FIG. 9 depicts an example configuration file for a featurizer, according to some embodiments.

FIG. 10 depicts an example configuration file for a fuser, according to some embodiments.

FIG. 11 depicts an example configuration file for a task, according to some embodiments.

FIG. 12 depicts an example configuration and accompanying configuration file for a model, specifying featurizers, fusers, and tasks, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, automatic ontology generation by embedding representations, and/or any combination thereof. Tasks relating to computers understanding details about an item may be referred to as item resolution or ItemRes herein, at least for purposes of this disclosure.

Figure 1:
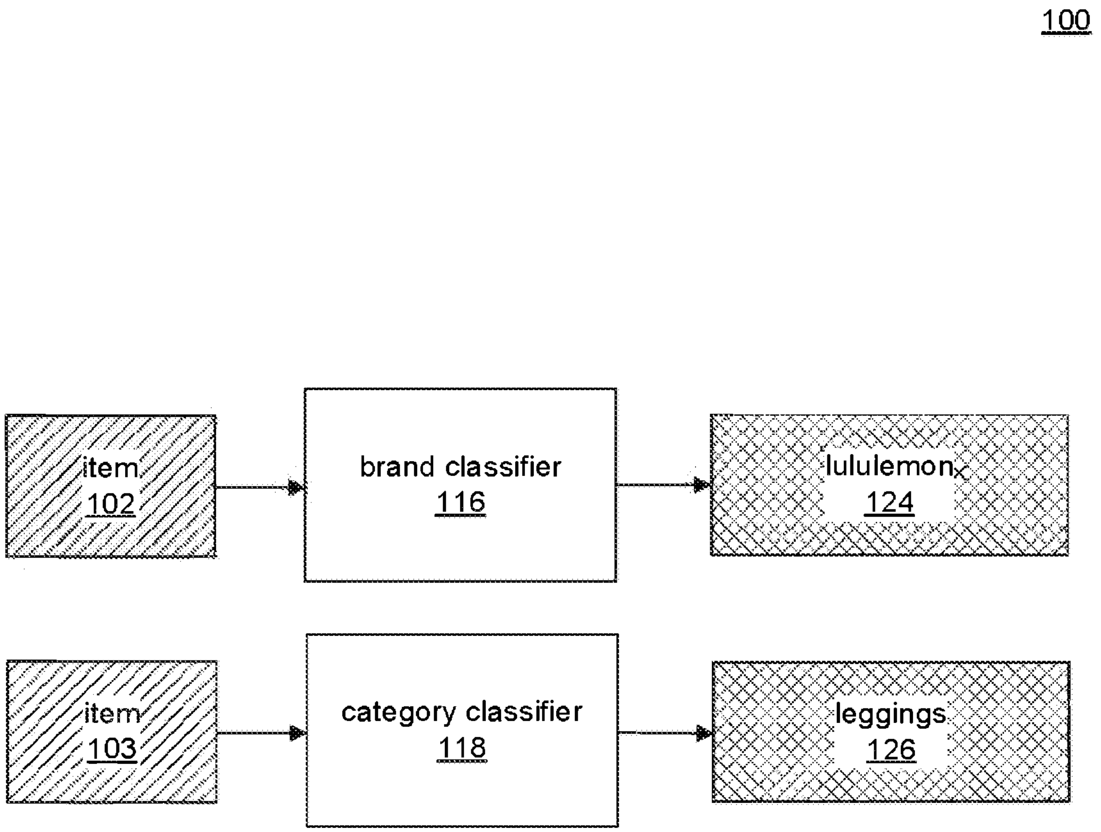
FIG. 1 depicts an arrangement of training models to learn one task per model, according to some embodiments of the present disclosure.

FIG. 1 depicts an arrangement 100 of training models to learn one task per model, in some embodiments.

Item 102 and item 103 each correspond to a given item, and each may represent information known about the corresponding item. Such information may include but is not limited to text. Information of item 102 or item 103 may represent attributes such as a name (title), description, photo, brand, category, condition, additional information provided by a seller, to name a few non-limiting examples. In some use cases, the separate informational representations of item 102 and item 103 may correspond to the same item but may be filtered or rearranged in specific ways as may be required for input with a given classifier, for example.

Classifiers, such as brand classifier 116 and category classifier 118, correspond to machine-learning (ML) algorithms that may be trained or tasked with predicting a value for a corresponding information type (e.g., brand, category, etc.). The type of task (classification) as shown in FIG. 1 may involve predicting a value from a set of known possible values.

Various ML techniques or algorithms may be used for performing classification, e.g., regression or estimation based on vectorized feature sets, backpropagation via perceptrons, artificial neural networks (ANNs), random forests, etc., to provide a few non-limiting examples. At the level shown in FIG. 1, a specific algorithm is not shown, nor is any particular algorithm required. According to some embodiments, various techniques may be employed, for example, based at least in part on data sets, feature sets, performance requirements, operating environments, and so on.

Outputs 124 and 126 represent results of classifiers 116 and 118, respectively, upon having processed information of items 102 and 103, respectively. More specifically, in the example shown in FIG. 1, the brand classifier 116 may classify user-provided item information as "lululemon" in output 124, even in a use case in which a seller does not provide the brand as "lululemon" in the information corresponding to item 102, according to some embodiments. Likewise, the category classifier 118 may provide "leggings" as output 126 corresponding to item 103 information, even if item 103 does not explicitly provide a category of "leggings," in this example embodiment. Other results and types of classifiers and information may be contemplated within the scope of this example embodiment.

Figure 2:
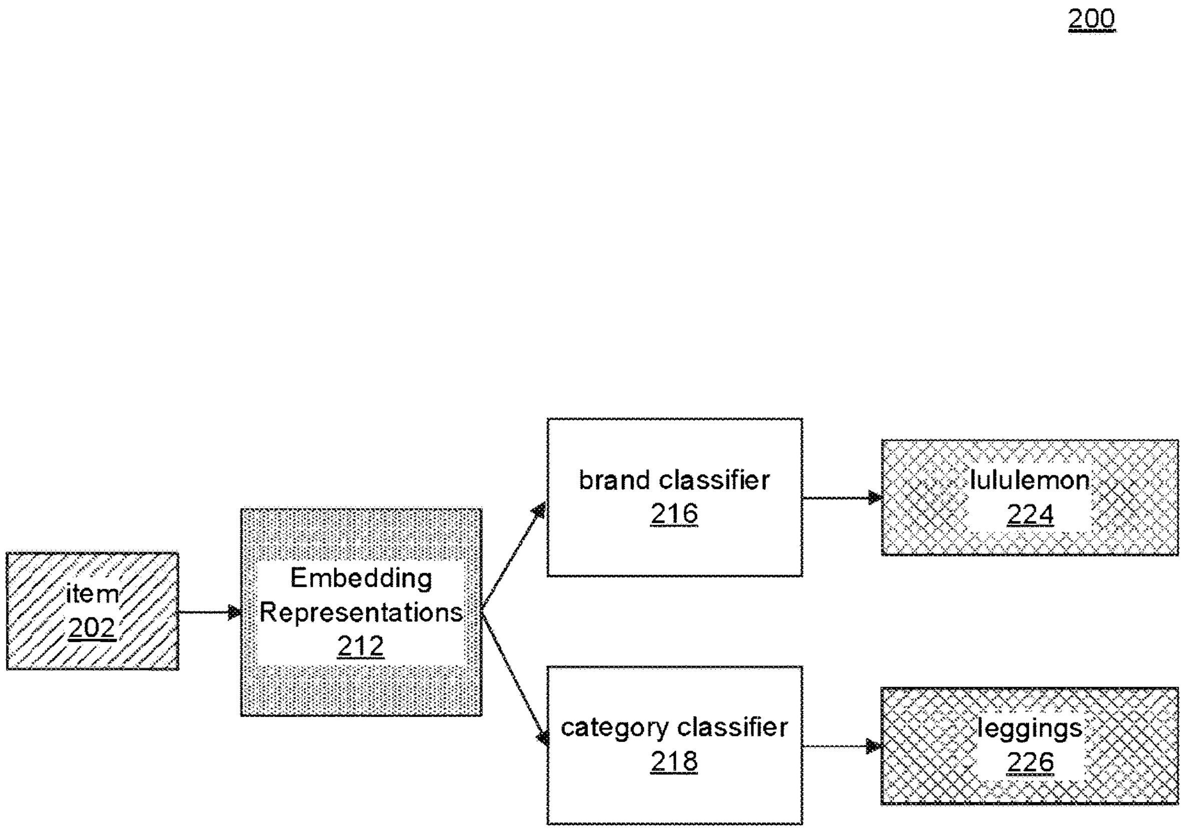
FIG. 2 depicts an example of an improved arrangement of training one model to learn multiple tasks simultaneously, according to some embodiments.

FIG. 2 depicts an example of an improved arrangement 200 of training one model to learn multiple tasks simultaneously, according to some embodiments.

Item 202 as shown in FIG. 2 represents information corresponding to an item. In comparison to FIG. 1, item 202 may include, inter alia, the same or similar information as that of item 102, item 103, or a combination thereof, for example. Embedding representations 212 may preprocess the information of item 202 to produce a numerical representation (e.g., vector, matrix, tensor, etc.) of the information, in some embodiments. The same numerical representation may be input to different algorithms, classifiers, etc., such as brand classifier 216 and category classifier 218 (which may correspond to brand classifier 116 and category classifier 118, respectively), to produce outputs 224 and 226, respectively (which may correspond to outputs 124 and 126, respectively), e.g., "lululemon" and "leggings," respectively, in this non-limiting example.

Figure 3:
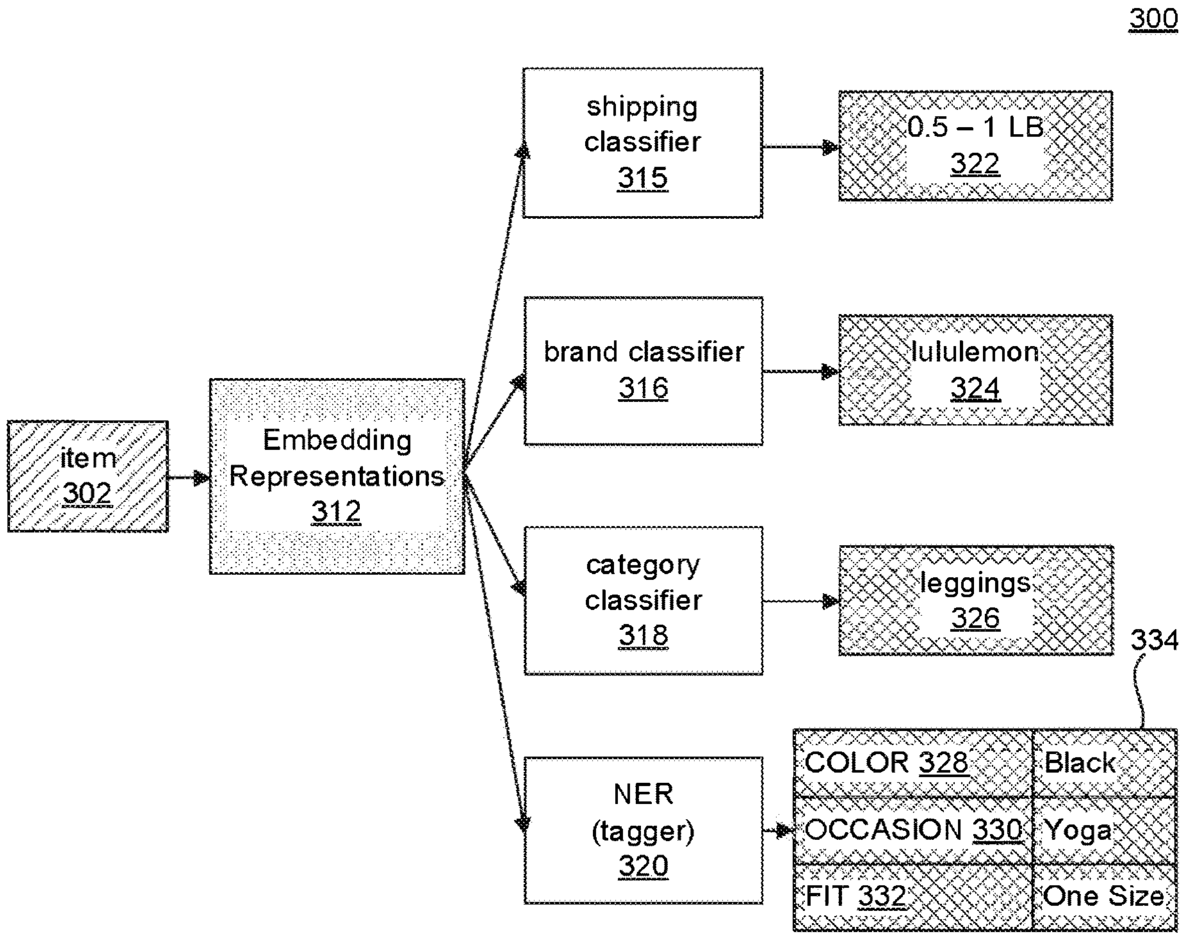
FIG. 3 depicts a further example of an improved arrangement of training one model having arbitrarily many outputs, according to some embodiments.

FIG. 3 depicts a further example of an improved arrangement 300 of training one model having arbitrarily many outputs, according to some embodiments.

As shown in FIG. 3, item 302 may correspond to item 202 as shown in FIG. 2; likewise, embedding representations 312 may correspond to embedding representations 212. As with the brand- and category-classifier elements described above with respect to FIGS. 1 and 2, brand classifier 316 may be configured to predict a brand of a corresponding item based on item 302, and category classifier 318 may be configured to predict a category corresponding to the item based on item 302, resulting in outputs 324 and 326, as with corresponding elements of FIGS. 1 (124 and 126) and FIGS. 2 (224 and 226). As an additional example, shipping classifier 315 may be configured to predict a shipping weight of the item corresponding to item 302, based at least in part on the information of item 302, resulting in output such as output 322 (e.g., a range of a half-pound to a pound, in this embodiment).

Named-entity recognition (NER) may additionally be used with embedding representations 312, in some use cases, for example, as a tagger. In the example shown in FIG. 3, NER (tagger) 318 may receive numerical input from embedding representations 312, to produce output 334, which may include multiple tags or labels to associate with words or embeddings corresponding to any text data in item 302. For example, where item 302 includes black leggings used for yoga, one size fits all" as a text description, NER 320 may be used to identify (tag) the word "black" as a color 328, "yoga" as an occasion 330, "one size" as a fit 332 or size, etc., among any number of other possible tags, according to some embodiments.

Figure 4:
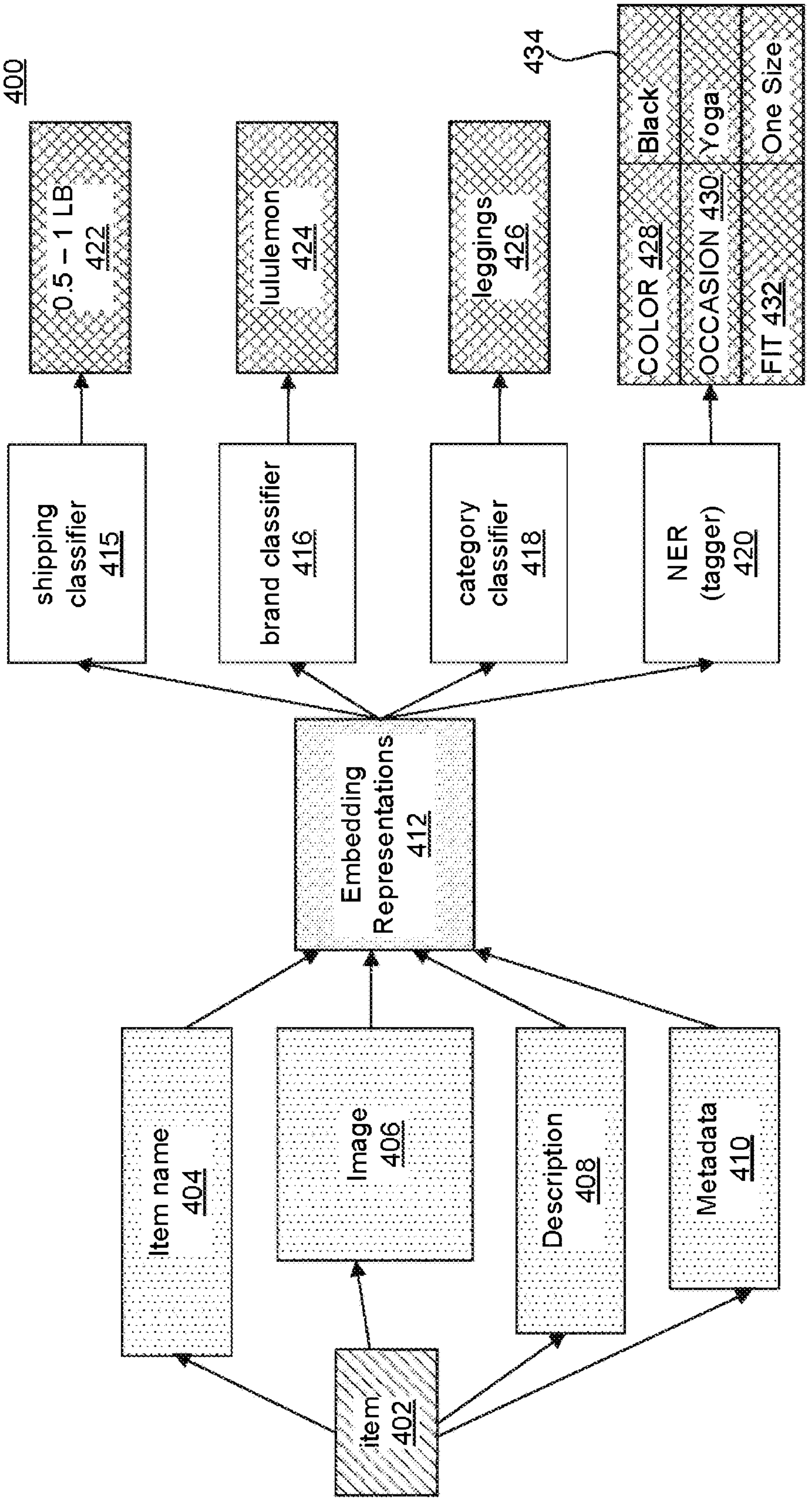
FIG. 4 depicts a further example of an improved arrangement of training one model having arbitrarily many outputs and arbitrarily many inputs, according to some embodiments.

FIG. 4 depicts a further example of an improved arrangement 400 of training one model having arbitrarily many outputs and arbitrarily many inputs, according to some embodiments.

The improved arrangement 400 as shown in FIG. 4 resembles the improved arrangement 300 as shown in FIG. 3, adding further description of the item information (item 402) to be consumed by a given block (embedding representations 412). Specifically, item 402 may be analyzed or filtered, in this embodiment, to isolate specifically item name 404, item image 406, item description 408, and metadata 410, in this embodiment, for consumption by embedding representations 412, to undergo similar processing and yield similar results such as those shown in FIG. 3 (e.g., with FIG. 3 elements 315-334 corresponding to FIG. 4 elements 415-434, respectively).

Thus, the elements of item name 404, item image 406, item description 408, and metadata 410 may represent modules configured to create numerical representations of those respective types of information. Accordingly, as shown in FIG. 4, embedding representations 412 may then be invoked for aggregating the corresponding numerical representations and sharing them across corresponding tasks (e.g., elements 415-420), in some embodiments.

Figure 5:
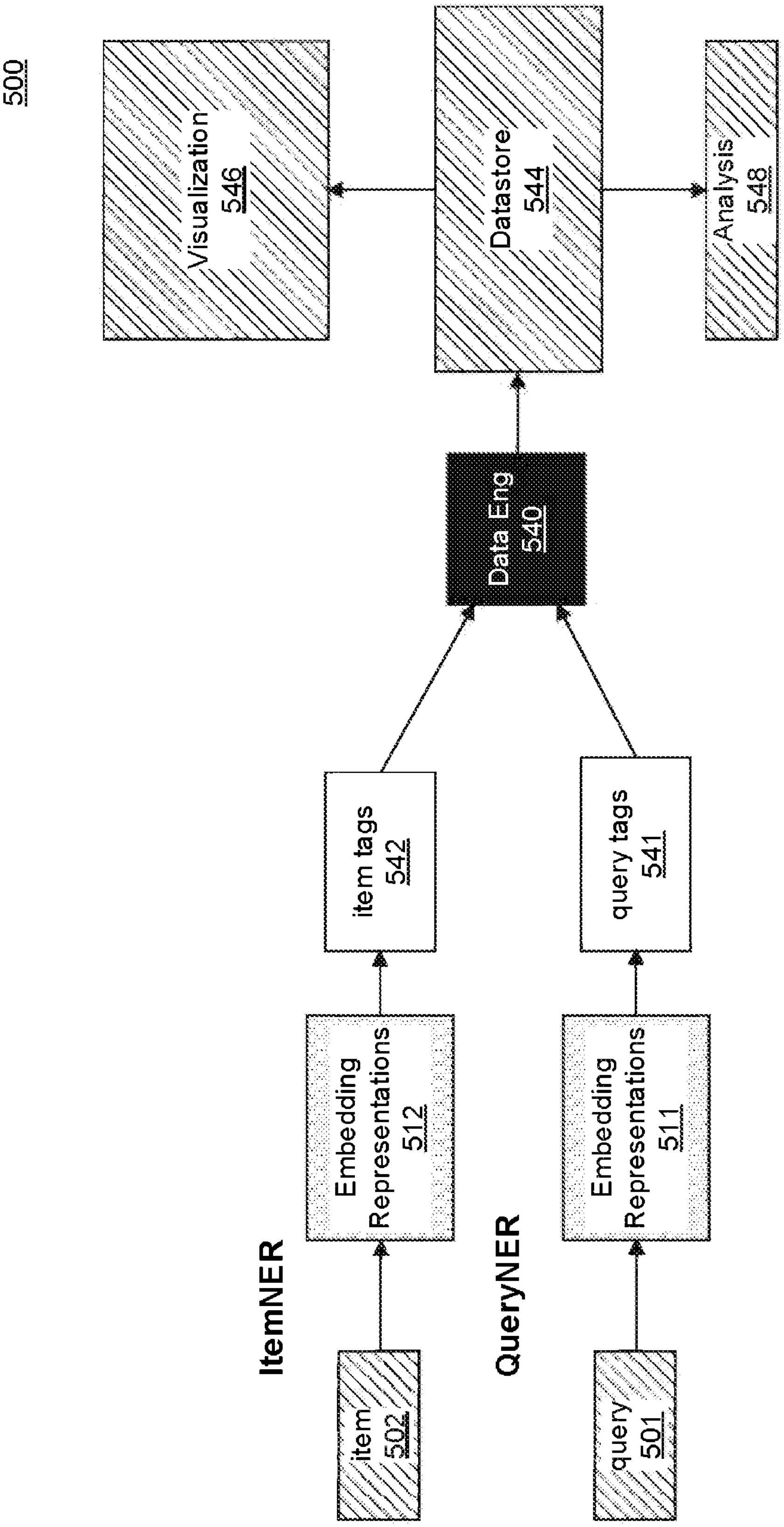
FIG. 5 depicts embedding representations to implement named-entity recognition as a subservice, according to some embodiments.

FIG. 5 depicts embedding representations to implement NER 500 as a subservice, according to some embodiments.

As embedding representations 512 and 511, separate NER workflows may be used, e.g., ItemNER subservice and QueryNER subservice, to generate item tags 542 from item 502 and query tags 541 from query 501, respectively. In some embodiments, embedding representations 511 and embedding representations 512 may be the same single implementation of embedding representations, for example.

Data engineering 540 may be an optional intermediate workflow to provide any processing that may be necessary, according to some embodiments, for processing tags or embedding representations, to be stored, e.g., in datastore 544. Datastore 544 may comprise a database, data lake, data warehouse, or other comparable storage mechanism.

Using datastore 544, other tools may operate to visualize the stored data (e.g., a visualizer to provide visualization 546; an analyzer to provide analysis 548, etc.). Visualization may be interactive, in combination with analysis, which may be used to filter data or other representations, identify trends in the data, and perform other mathematical manipulation or transformation of the data, for example.

Visualization 546 and/or analysis 548 may be provided by one or more business-intelligence tools or data-science tools, in some embodiments. Datastore 544 may be any local or remote storage for data in any form. Remote storage may be in the form of any file storage, object storage, block storage, attached storage, or other as-a-service offerings for cloud storage, for example. Additional description and examples are provided further elsewhere herein.

Figure 6A:
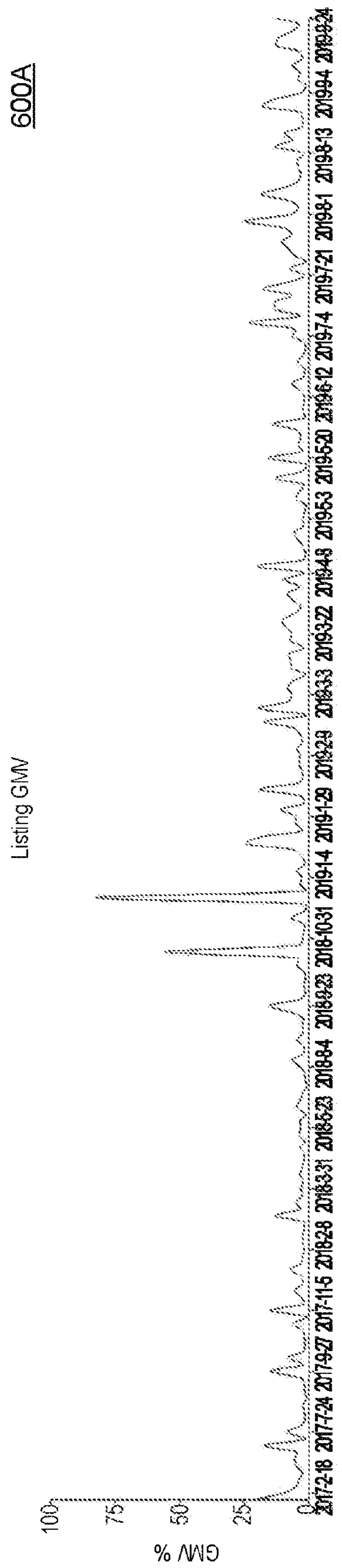
FIGS. 6A and 6B depict outputs of visualization and/or analysis, according to some embodiments.
Figure 6B:
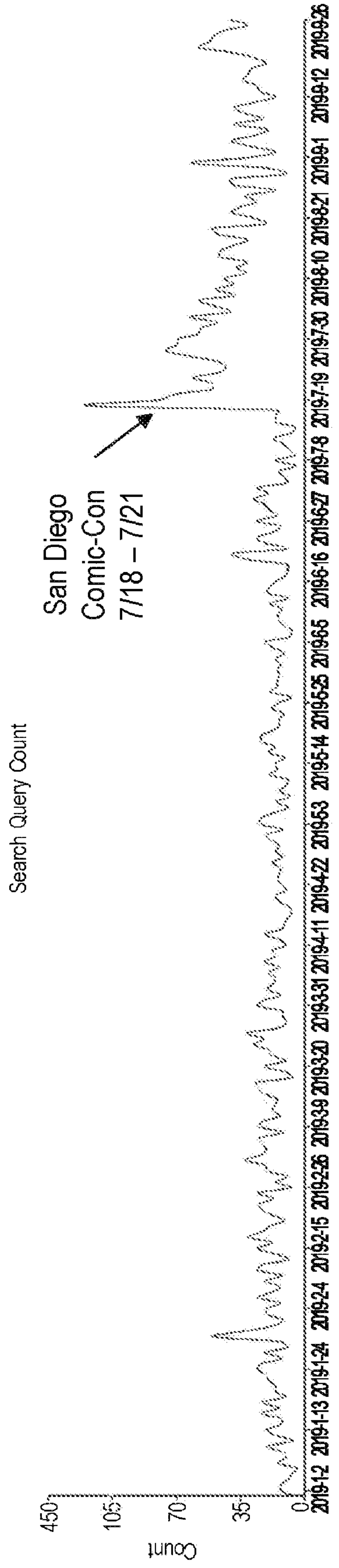

FIGS. 6A and 6B depict outputs of visualization and/or analysis, according to some embodiments.

In a specific example, FIGS. 6A and 6B depict results of analysis 548 and visualization 546 showing data from embedding representations outputs item tags 542 and query tags 541, as shown in FIG. 5.

A search term "funko batman" may be used to query datastore 544 from FIG. 5 (e.g., via data engineering 540), to find instances of items and other search queries that may match the search term's attributes. In this way, the word "funko" may be identified with a "BRAND" tag, and "batman" may be identified with a "CHARACTER" tag, for example.

Matching items may be aggregated by date, and plotted by their gross merchandise value (sum of list prices for sale), gross merchandise volume (GMV), or other metric for items, per graph 600A as shown in FIG. 6A. Also, for a given time window, a number of searches may be plotted in terms of matching queries over time, per graph 600B as shown in FIG. 6B (drilling down to a narrower date range).

In the example shown in FIG. 6B, a spike in search counts within a specific date range may be associated with Comic-Con. Comparing graphs 600A and 600B may provide an indication of supply (items in stock) and demand (user searches) on a given platform for an online marketplace, for example.

Figure 7:
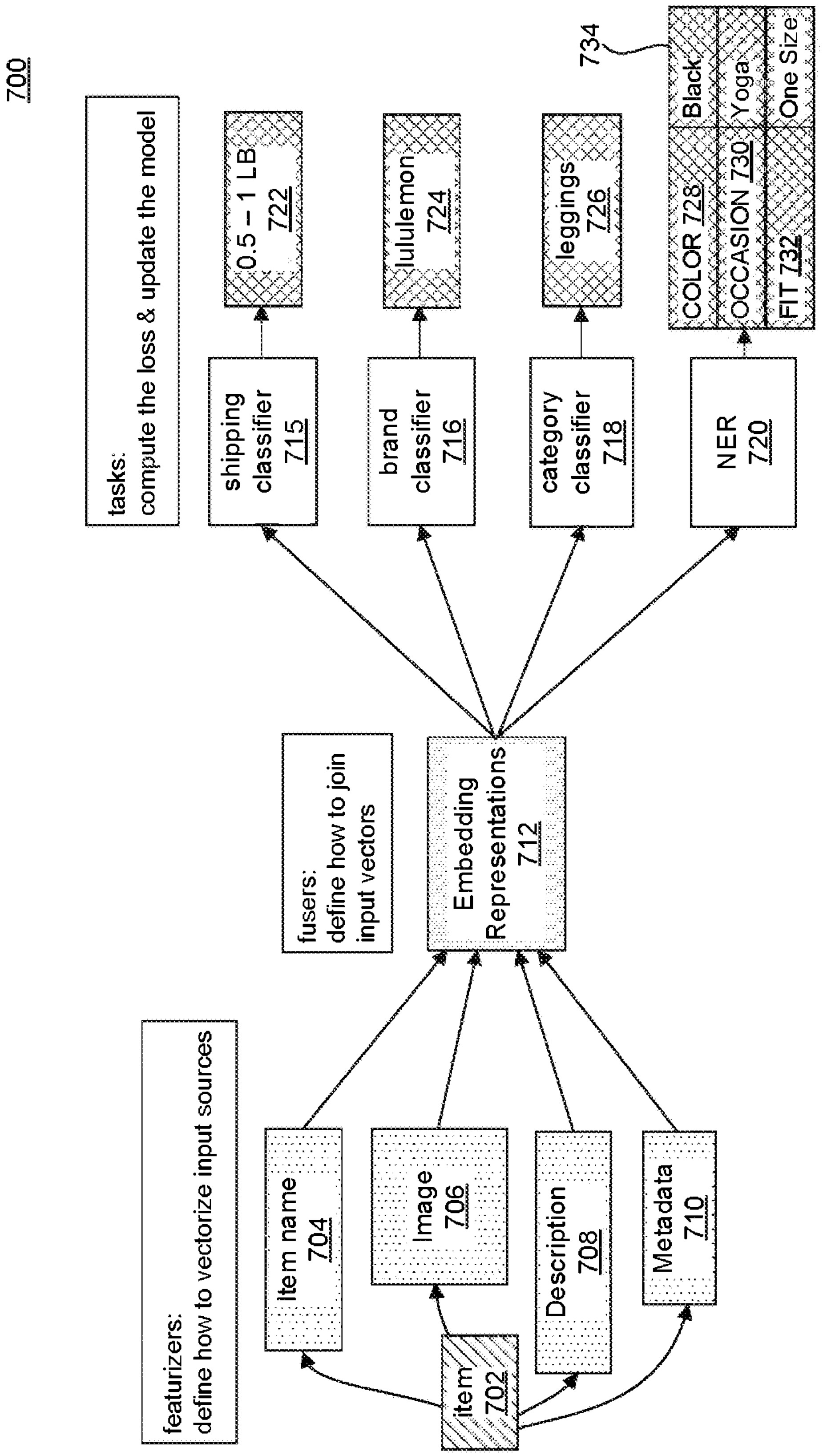
FIG. 7 depicts an overview of components with respect to the example of FIG. 4, according to some embodiments.

FIG. 7 depicts an overview of components with respect to the example of FIG. 4, according to some embodiments.

As shown in FIG. 7, item 702 may correspond to item 402 as shown in FIG. 4; likewise, embedding representations 712 may correspond to embedding representations 412. As with the brand- and category-classifier elements described above with respect to FIGS. 1, 2, and 4, brand classifier 716 may be configured to predict a brand of a corresponding item based on item 702, and category classifier 718 may be configured to predict a category corresponding to the item based on item 702, resulting in outputs 724 and 726, as with corresponding elements of FIGS. 1 (124 and 126) and FIGS. 4 (424 and 426). As an additional example, shipping classifier 715 may be configured to predict a shipping weight of the item corresponding to item 702, based at least in part on the information of item 702, resulting in output such as output 722 (e.g., a range of a half-pound to a pound, in this embodiment).

NER may additionally be used with embedding representations 712, in some use cases, for example, as a tagger. In the example shown in FIG. 7, NER (tagger) 718 may receive numerical input from embedding representations 712, to produce output 734, which may include multiple tags or labels to associate with words or embeddings corresponding to any text data in item 702. For example, where item 702 includes "black leggings used for yoga, one size fits all" as a text description, NER 720 may be used to identify (tag) the word "black" as a color 728, "yoga" as an occasion 730, "one size" as a fit 732 or size, etc., among any number of other possible tags, according to some embodiments.

The elements of item name 704, item image 706, item description 708, and metadata 710 may represent modules configured to create numerical representations of those respective types of information. As noted in FIG. 7, any or all of these elements 704-710 may be regarded as featurizers, which may define, in different ways, how to vectorize various input sources. Accordingly, as shown in FIG. 7, element embedding representations 712 may then be invoked for aggregating the corresponding numerical representations and sharing them across corresponding tasks (e.g., elements 715-720), in some embodiments.

Embedding representations 712 may be regarded as a placeholder for multiple fusers as defined in the annotations of FIG. 7. A fuser may be regarded as a module that may be configured to join or combines the input vectors (representations), and may then share the joined or combined input representations among a group of tasks, for example, according to some embodiments. Here, as shown in FIG. 7, tasks may be, e.g., shipping classifier 715, brand classifier 716, category classifier 718, and NER 720, in the depicted use case.

"Tasks" may also be regarded as including operations of computing a given loss function and/or updating a given ML model. A task module may also be responsible for various steps or operations in ML processes of computing a loss function (evaluating performance) and updating a model (adjusting modules in a model to improve the performance evaluation in a subsequent iteration).

FIG. 8 depicts example dataframes 800 before and after various transformations, including preprocessing and reindexing, by at least one dataset generator, according to some embodiments.

Given a brand ID and another type of identifier (L2 ID), various types of preprocessing, reindexing, and transforming may be performed with respect to a given data frame, in some embodiments.

Any of preprocessing, reindexing, and/or transforming, may include numerical operations: (e.g., log(x)), numerical normalization (e.g., divide by mean value), label indexing (e.g., map complex ID values to set(s) of integer values (such a counting up from 0)), and/or NER tag extraction by text-matching, to name a few non-limiting examples.

Additionally, or alternatively, preprocessing may include downloading images, or text operations such as replacing invalid characters, tokenizing text, cutting off (truncating) text inputs at a predetermined maximum length, e.g., for security bounds-checking or for performance reasons, etc.

FIG. 9 depicts an example configuration file 900 for a featurizer, according to some embodiments.

Featurizers may define, in different ways, how to vectorize various input sources. For example, sources of item names, item images, item descriptions, and various other metadata, may be represented numerically, e.g., in a form of vectors (or matrices or other tensors), in some embodiments. These featurizers may be joined, aggregated, or otherwise combined, as described further elsewhere herein.

FIG. 10 depicts an example configuration file 1000 for a fuser, according to some embodiments.

A fuser may be regarded as a module that may be configured to join or combine the input vectors (representations), and may then share the joined or combined input representations among a group of tasks, for example, according to some embodiments. FIG. 10 shows a non-limiting example YAML configuration (specification(s) or specs) for a given fuser, such as for item name or title embeddings, in an embodiment.

As described with respect to configuration file 1000, fusers and tasks may reference features using a format of a module name and column name separated by a slash, indented under an identifier of a feature set such as feats_to_fuse or input_name, for example. As shown, the module name of configuration file 1000 is title embedding, as named in configuration file 900 shown in FIG. 9.

FIG. 11 depicts an example configuration file 1100 for a task, according to some embodiments.

In featurizers, an encoder value or field that may specify a type (e.g., of available types of featurizers described elsewhere herein, such as with respect to items 704-710 of FIG. 7). Fusers may have a type explicitly specified in a configuration file, for example, but may also have a pre-set default type. As described with respect to configuration file 1100, where no type is explicitly specified, the default type may be applied. A value in a "type" field (or default type) may specify type of task to be performed (such as with respect to items 715-720 of FIG. 7). Tasks may also use a label col field to acquire column name(s) in a dataset corresponding to specific column(s) with one or more ground truth labels for pertaining to a given task (e.g., titles are same), in an embodiment as shown in configuration file 1100 of FIG. 11.

FIG. 12 depicts an example configuration 1200 and accompanying configuration file 1208 for model(s) 1202-1215, collectively, specifying featurizers, fusers, and tasks, according to some embodiments.

As shown in FIG. 12, a title-embedding featurizer (title embedding 1202) and a residual neural network (resnet 1212) may be configured as featurizers per the feature specs of the configuration file 1208 as shown. Similarly, title sim_vector_1204 and title_and_photo 1214 may be configured as fusers per the fuser_specs of the configuration file 1208 as shown. NER (ner 1206), title similarity (title_sim 1211), and shipping-weight classification (shipping_class 1215) may be configured as tasks per the task_specs of the configuration file 1208 as shown.

For the configuration files of FIGS. 9-12, various types of tools, languages, and standards may be used to facilitate experiments or rapid prototyping, allowing for not only tweaking, tuning, or otherwise changing various settings, specifications, and parameters, but also executing, deploying, and tracking results and performance. Various tools or frameworks for test configuration management, automation, and/or prototyping may be employed here, e.g., Kubeflow, Polyaxon, MLflow, etc., or other more generic infrastructure-as-code (IaC) tools or frameworks (not necessarily specific to machine learning), any of which may employ various languages or formats for specifying and implementing configurations, e.g., YAML, TOML, Python, Ruby, etc.

Figure 13:
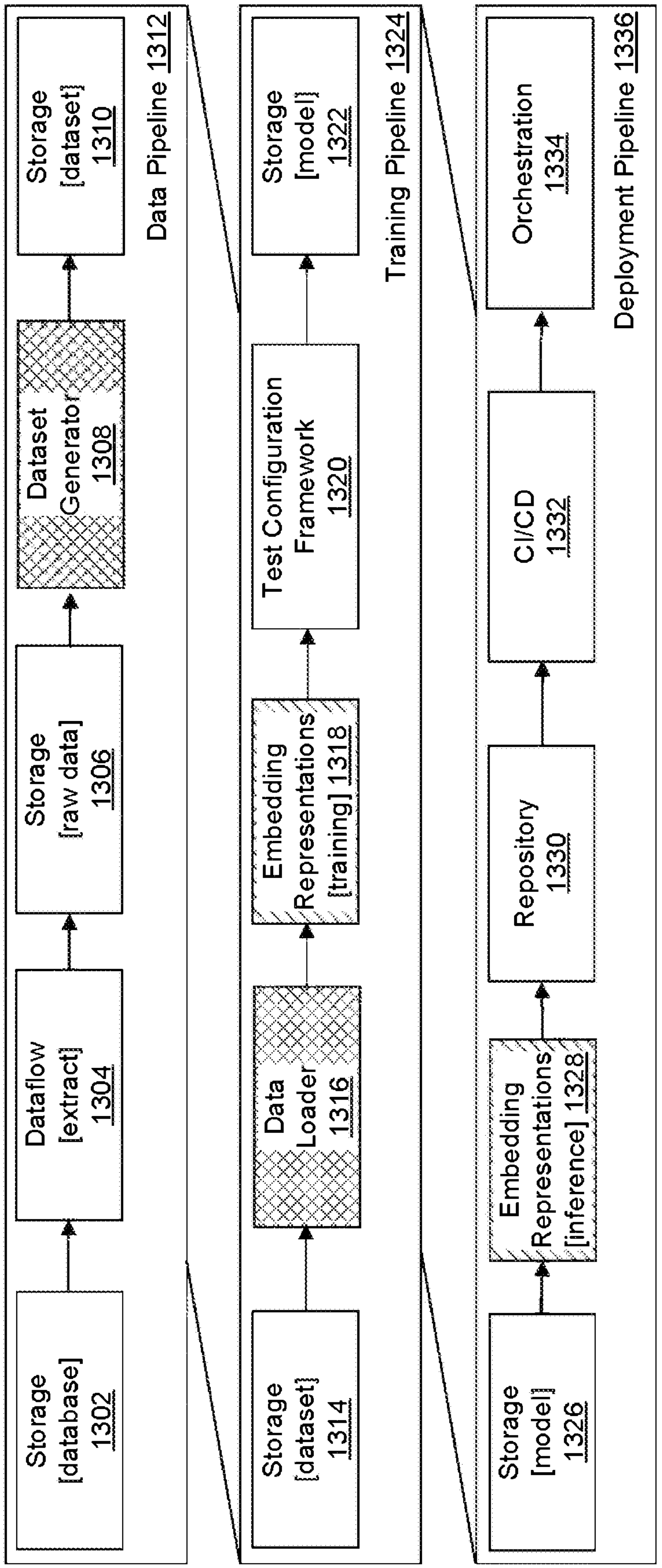
FIG. 13 depicts an architecture overview of data-, training-, and deployment-pipelines including embedding representations, according to some embodiments.

FIG. 13 depicts an architecture overview of a data pipeline 1312, training pipeline 1324, and deployment pipeline 1336, each including embedding representations, according to some embodiments.

As with datastore 544, storage elements as shown in FIG. 13, e.g., items 1302, 1306, 1310, 1314, 1322, 1326, etc., may include local or on-premises storage in any form, remote storage may be in the form of any file storage, object storage, block storage, attached storage, or other as-a-service offerings for cloud storage, for example, or any combination of the above, e.g., with hybrid-cloud storage solutions. Such storage elements may be configured to store raw data or formatted data, unstructured or structured, in any particular schema or other format for access and retrieval, in some embodiments. For some vehicles of storing large volumes of data, Apache Hadoop HDFS, Amazon S3, or compatible storage options, may be used. Similarly, for dataflow elements (e.g., as may be used with feature extraction), e.g., items 1304, 1308 (dataset generator), and 1316 (data loader), some service offerings available for prototyping and/or production with high-volume processing of large datasets and feature extraction, e.g., ML processing, may include Google Dataproc or BigQuery, or Apache Spark, for example.

As another specialized form of storage, repository 1330 may be configured to host source code, executable code, virtual machines, or containerized environments for distribution and deployment. An example of a repository for containerized applications, such as for use with microservice architecture or ready deployment, may include a container registry, such as *Portus*, Quay, Docker Hub, or comparable solutions.

For test configuration framework 1320, as described also in the context of the configurations of FIGS. 9-12, various tools or frameworks for test configuration management, automation, and/or prototyping may be employed here, e.g., Kubeflow, Polyaxon, MLflow, etc., or other more generic IaC tools or frameworks, any of which may employ various languages or formats for specifying and implementing configurations, e.g., YAML, TOML, Python, Ruby, etc.

Continuous integration and continuous deployment or delivery (CI/CD 1332) may be carried out with various combinations of separate tools or with prepackaged solutions that may integrate with virtualization or containerization platforms. For example, Docker, Zones, rkt, jails, or comparable containerization, CI/CD tools such as Spinnaker continuous delivery, CircleCI, Harness, etc., may be leveraged, alone or in combination with other orchestration tools such as Kubernetes Engine, Nomad, Mesos, etc., per orchestration 1334 as shown in FIG. 13.

For ML training, including supervised, unsupervised, semi-supervised learning, embedding representations 1318 training module(s) may be integrated into training pipeline 1324 as part of a given embedding-representations workflow. For inferences and other outputs based on ML processes, embedding representations 1328 inference module(s) may be integrated into deployment pipeline 1336 as part of an overall embedding-representations workflow as shown in FIG. 13.

Figure 14:
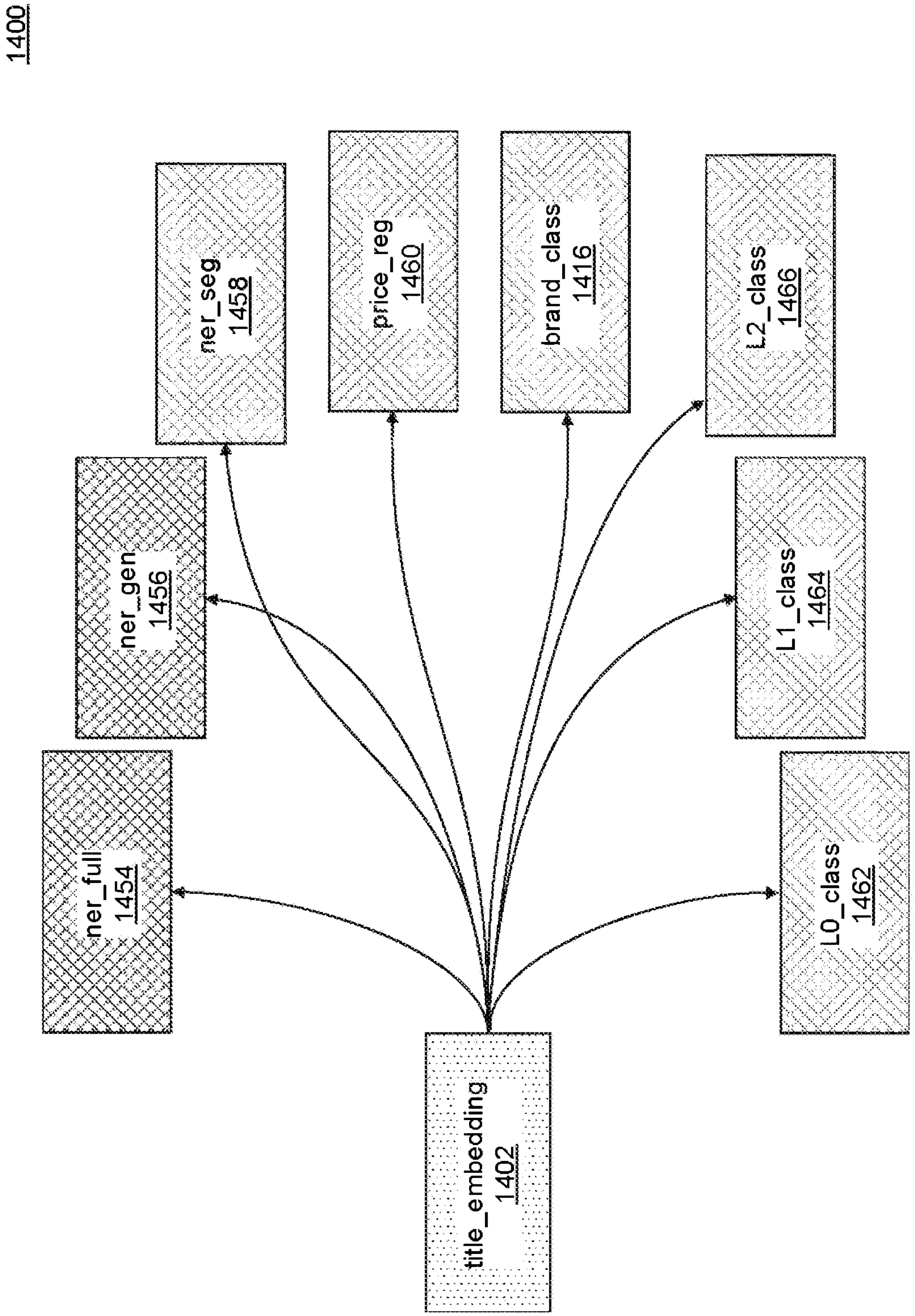
FIG. 14 depicts an example of model creation, according to some embodiments.

FIG. 14 depicts an example of model creation, according to some embodiments.

A title_embedding 1402 featurizer is shown in FIG. 14, with eight tasks (no fusers specifically shown). The tasks depicted include NER full (ner_full 1454) named-entity recognition across all entities (e.g., of a given dataset), generalized NER (ner_gen 1456), which may provide like treatment for some entities identified in common with each other, providing a reduced version of ner_full 1454, depending on considerations of performance and resources, etc. NER segmentation (ner_seg 1458) may predict whether or not a given word or combination of words is to be treated as a single entity.

Price regression (price_reg 1460) may provide, via any of various means including ML-based techniques, a prediction of an item price or at least one endpoint or statistical representation of a given price range for example. For illustrative purposes of the example of FIG. 14, a brand classifier (brand_class 1416), such as that of items 116, 216, 316, 416, and 716, may be included here, among any combination of other classifiers or related tasks. Level-0 class (L0_class 1462), level-1 class (L1_class 1464), or level-2 class (L2_class 1466), among any other levels of depth, may provide, for example, category predictions at different levels of a category taxonomy for a given platform, according to some embodiments.

Figure 15:
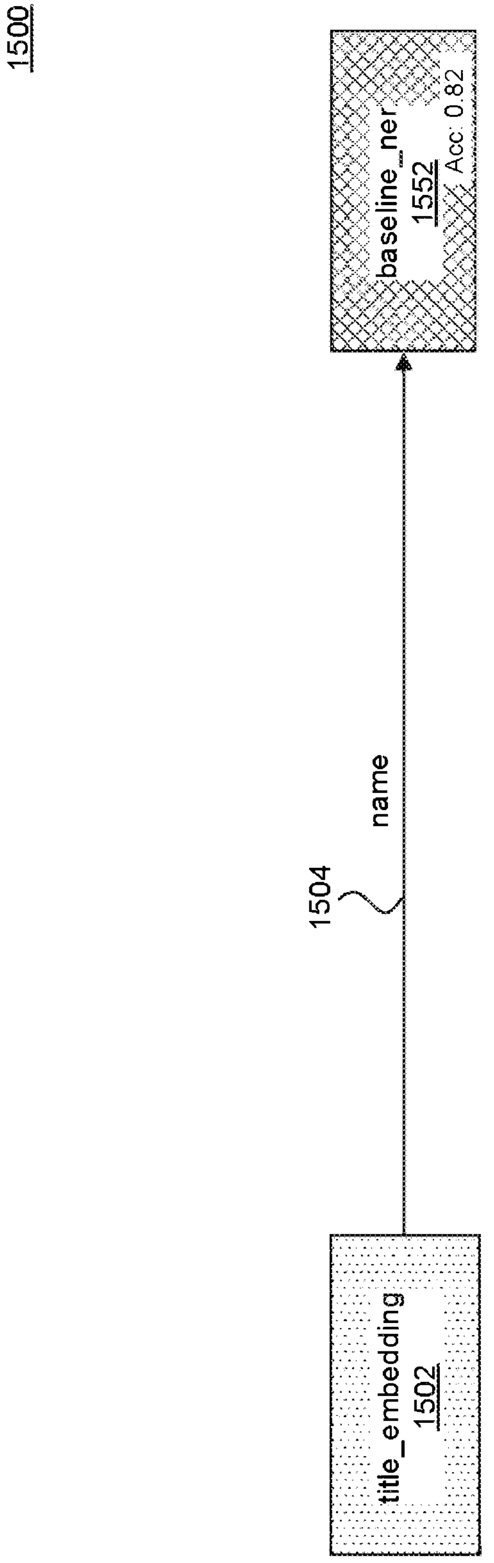
FIG. 15 depicts a baseline arrangement for named-entity recognition, according to some embodiments.

FIG. 15 depicts a baseline arrangement for named-entity recognition, according to some embodiments.

As an example featurizer module for item names/title 1504, title embedding 1502 is provided, as with title embedding 1202 or 1402, in some embodiments, for use with Transformer techniques (not shown). Also shown in FIG. 15 is a generic NER task module (baseline_ner 1552), with an accuracy score of this task module (Acc. 0.82), to be used as a baseline for comparison with other tasks, as shown in FIG. 16, and described further below.

Figure 16:
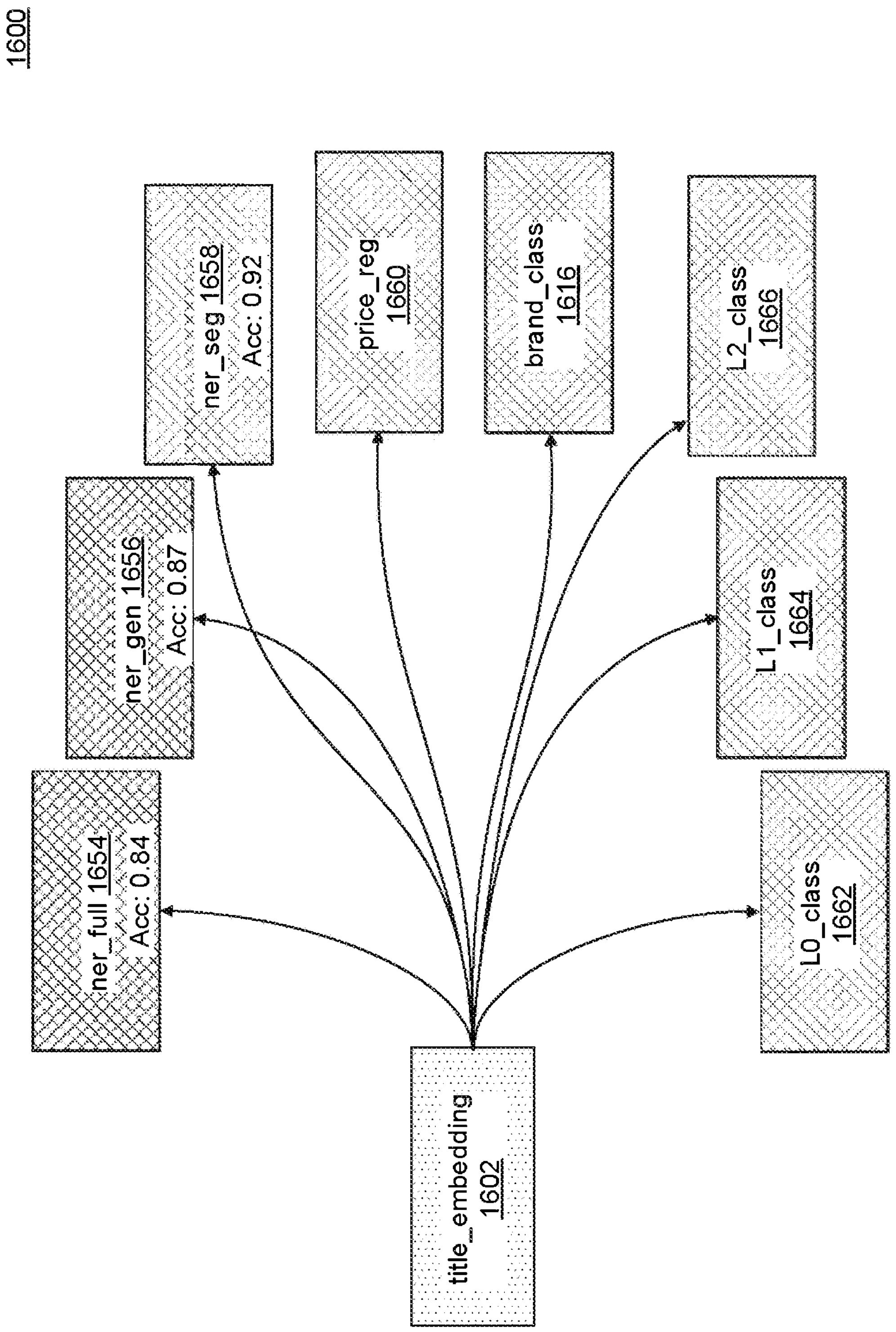
FIG. 16 depicts the model creation of FIG. 14 as an example of multiple named-entity recognition, according to some embodiments.

FIG. 16 depicts the model creation of FIG. 14 as an example of multiple named-entity recognition, according to some embodiments.

As a further example, title embedding 1602 featurizer is shown in FIG. 16, with eight tasks (no fusers specifically shown), as a module for item names/title, similar to title embedding 1202, 1402, or 1502, in some embodiments, for use with Transformer techniques (not shown). The tasks depicted include NER full (ner_full 1654) named-entity recognition across all entities (e.g., of a given dataset), generalized NER (ner_gen 1656), which may provide like treatment for some entities identified in common with each other, providing a reduced version of ner_full 1654, depending on considerations of performance and resources, etc. NER segmentation (ner_seg 1658) may predict whether or not a given word or combination of words is to be treated as a single entity.

Price regression (price_reg 1660) may provide, via any of various means including ML-based techniques, a prediction of an item price or at least one endpoint or statistical representation of a given price range for example. For illustrative purposes of the example of FIG. 16, a brand classifier (brand_class 1616), such as that of items 116, 216, 316, 416, 716, and 1416 may be included here, among any combination of other classifiers or related tasks. Level-0 class (L0_class 1662), level-1 class (L1_class 1664), or level-2 class (L2_class 1666), among any other levels of depth, may provide, for example, category predictions at different levels of a category taxonomy for a given platform, according to some embodiments.

Accuracy numbers are shown for the NER tasks (1654-1658). Here, FIG. 16 shows that ner_full 1654, in this example configuration, performs about two percent better in terms of accuracy (Acc. 0.84 versus 0.82) compared with baseline_ner 1552 of FIG. 15. This improvement may be attributed to sharing of information across tasks, which may be achieved at least across the eight tasks as shown in FIG. 16, among other possible combinations of tasks, in various embodiments.

Figure 17:
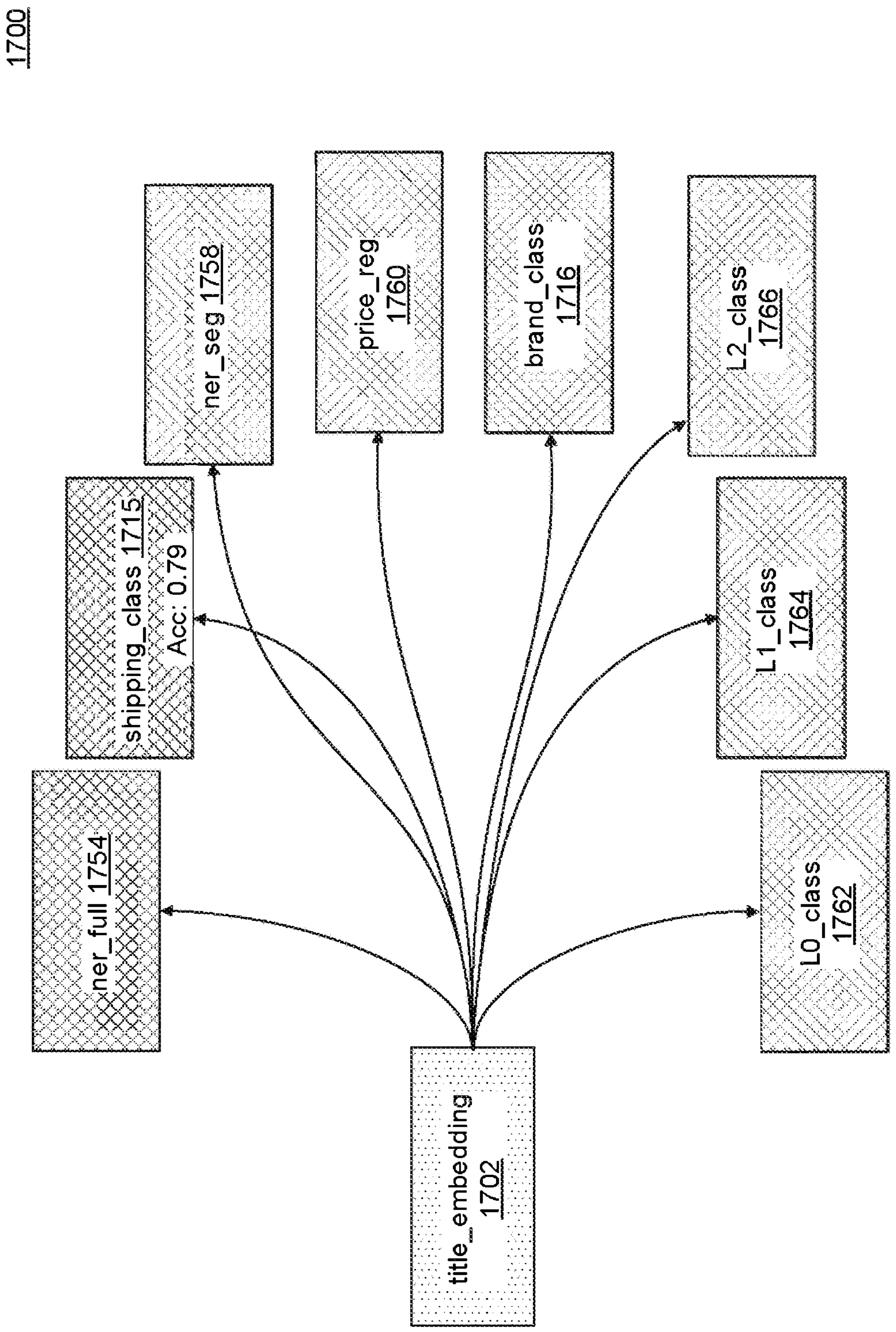
FIG. 17 depicts the example of FIG. 16 as applied to shipping, according to some embodiments.

FIG. 17 depicts the example of FIG. 16 as applied to shipping, according to some embodiments.

As a further example, title embedding 1702 featurizer is shown in FIG. 17, with eight tasks (no fusers specifically shown), as a module for item names/title, similar to title embedding 1202, 1402, 1502, or 1602, in some embodiments, for use with Transformer techniques (not shown). The tasks depicted include NER full (ner_full 1754) named-entity recognition across all entities (e.g., of a given dataset). NER segmentation (ner_seg 1758) may predict whether or not a given word or combination of words is to be treated as a single entity.

Price regression (price_reg 1760) may provide, via any of various means including ML-based techniques, a prediction of an item price or at least one endpoint or statistical representation of a given price range for example. For illustrative purposes of the example of FIG. 17, a brand classifier (brand_class 1716), such as that of items 116, 216, 316, 416, 716, 1416, and 1616 may be included here, among any combination of other classifiers or related tasks. Level-0 class (LO_class 1762), level-1 class (L1_class 1764), or level-2 class (L2_class 1766), among any other levels of depth, may provide, for example, category predictions at different levels of a category taxonomy for a given platform, according to some embodiments A shipping-weight classifier (shipping class 1715), similar to item 315, 415, 715, or 1215, may provide a predicted weight classification for shipping a given item. As shown in FIG. 17, an accuracy score is also provided (Acc. 0.79), for purposes of tracking accuracy where shipping classification is a primary purpose of this model, in this example embodiment depicted.

Figure 18:
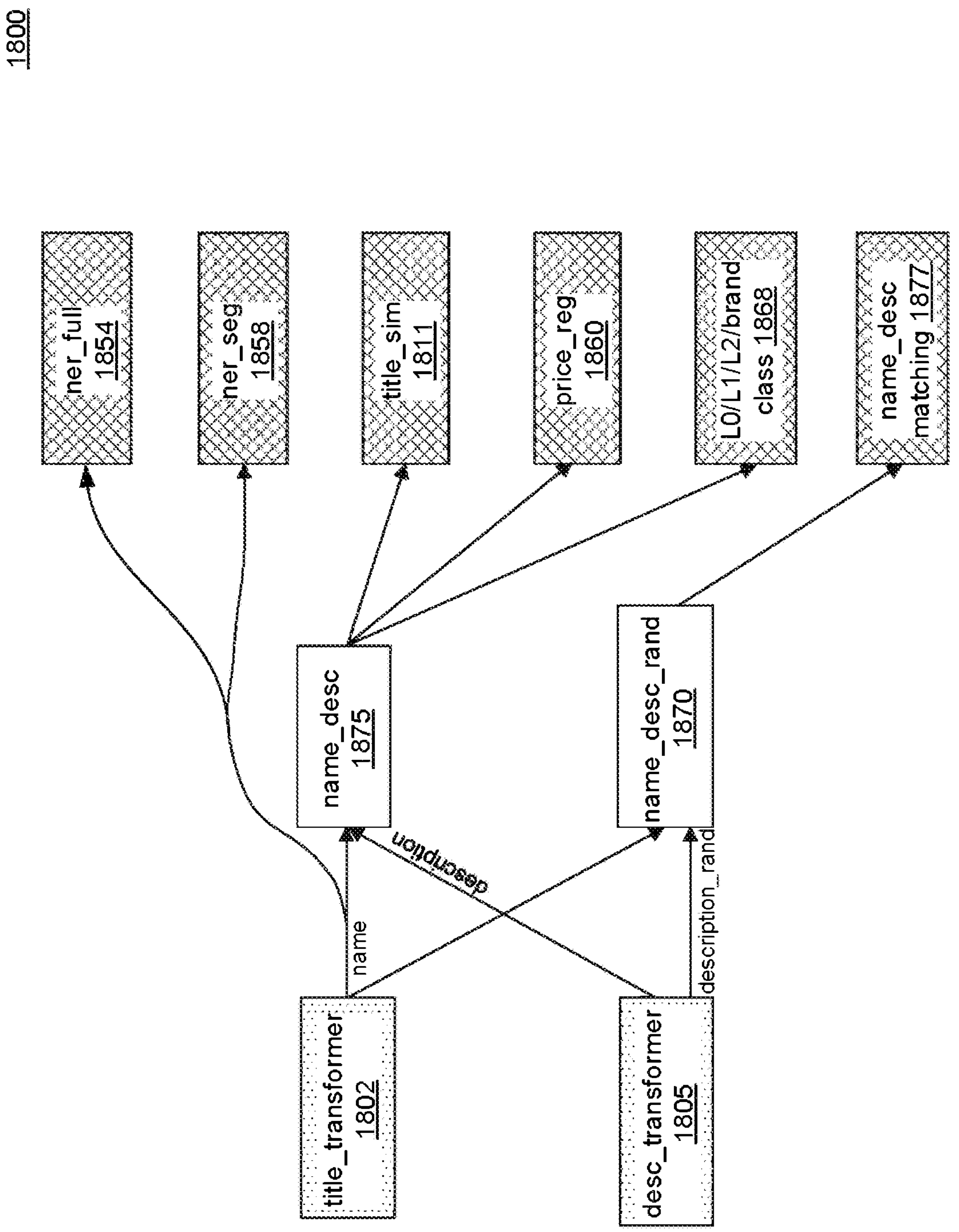
FIG. 18 depicts example Transformers for titles and descriptions using text, according to some embodiments.

FIG. 18 depicts an example configuration 1800 of Transformers for titles and descriptions, according to some embodiments.

In the model configuration shown in FIG. 18, in a non-limiting example embodiment, Transformers may be used to leverage both item titles and item descriptions for the given set of tasks, to improve performance for some use cases. For this purpose, intermediate representations (e.g., name, description, description_rand, etc.) such as those provided via the name_desc* 1870-1875 modules with ML pipelines, such as for finding similar items, may be used as shown here.

For example, title_transformer 1802 may be a featurizer module of type "Transformer" for item names or titles, according to an embodiment. Similarly, the desc_transformer 1805 module may represent a featurizer module of type "Transformer" for item descriptions. The name_desc_rand 1870 module may be a fuser module configured to combine an item name/title and an item description that may be arbitrarily selected or provided at random, in an embodiment.

Following this combination, a name_desc 1875 module may be a fuser module configured to combine names and descriptions, e.g., from separate featurizers models 1802 and 1805. Moreover, either of name_desc 1875 or name_desc_rand 1870, alone or in combination (e.g., as a module for embedding representations), may feed into one or more tasks, according to the enhanced techniques described herein.

The name_desc_matching 1877 element represents a task configured to predict whether the item name (e.g., "name" from 1802 to 1875) and arbitrary description ("description rand" from 1805 to 1870) may correspond to the same item. This task may be performed for purposes of tracking and improving accuracy or performance of the other tasks, according to some example embodiments.

Similar to other elements described herein, ner_full 1854, ner_seg 1858, and price_reg 1860 correspond to similar elements such as ner_full 1654, ner_seg 1658, and price_reg 1660 as shown in FIG. 16, for example. LO/L1/L2/brand_class 1868 may correspond to any combination of items 1662, 1664, 1666, or 1616 from FIG. 16, for example, while the title_sim 1811 task may correspond similarly to title sim 1211 as shown in FIG. 12.

Figure 19:
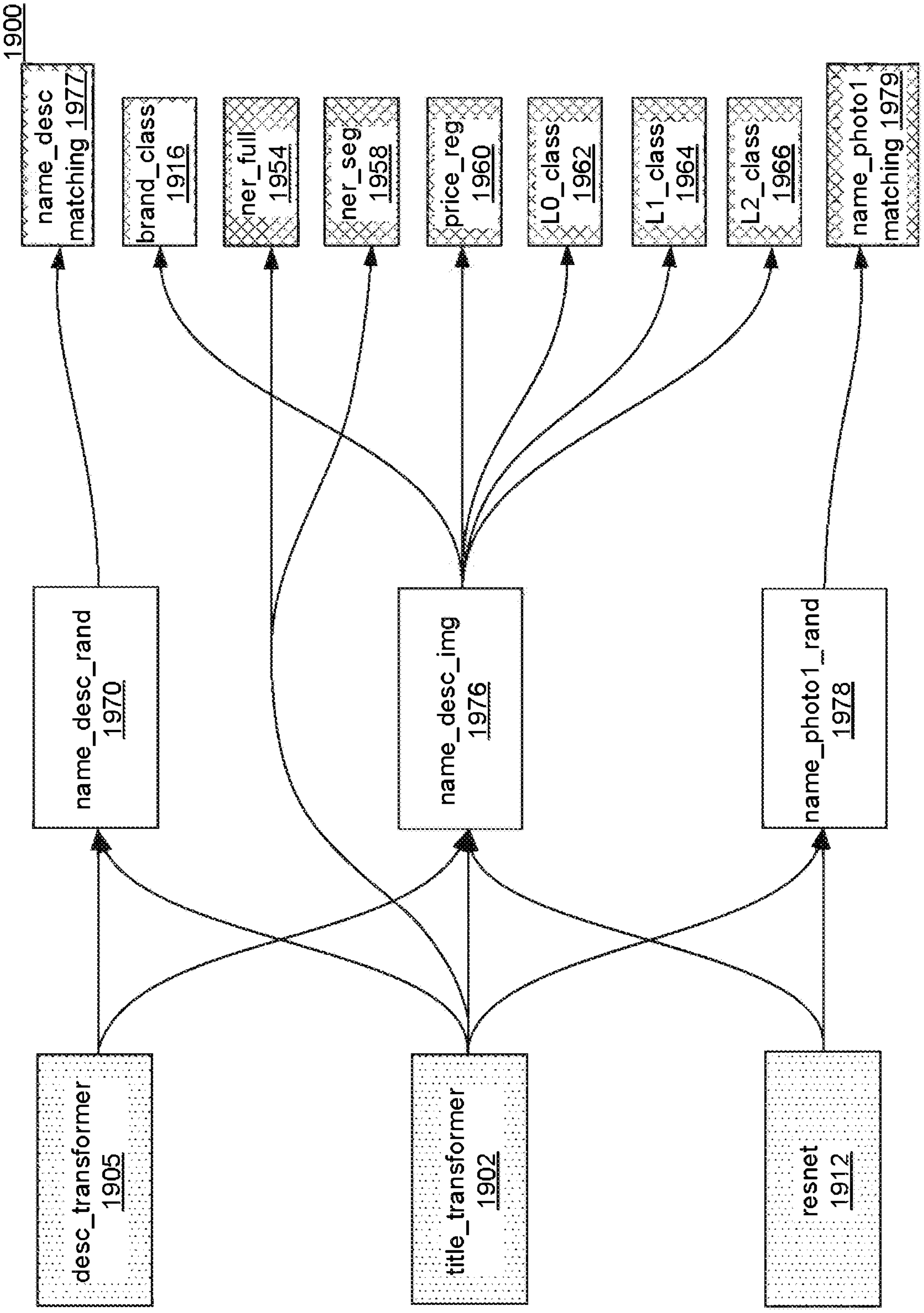
FIG. 19 depicts Transformers for titles and description using text and images, according to some embodiments.

FIG. 19 depicts an example configuration 1900 of Transformers for titles and description using text and images, according to some embodiments.

In the model configuration shown in FIG. 19, in a non-limiting example embodiment, Transformers may be used to leverage both text (e.g., item titles and/or item descriptions) and images (e.g., photos of items, where sellers may upload their own photos of their items to sell), for the given set of tasks, to improve performance for some use cases. For this purpose, intermediate representations (e.g., name, description, description_rand, etc.) such as those provided via the name_desc_img 1976 and/or name_photo1_random 1978 fuser modules (e.g., for images) or in ML pipelines, such as for finding similar items, may be used as shown here. For image-based featurization and generation of intermediate representations, a resnet 1912 featurizer module may be configured, using a ResNet architecture for processing images The name_desc_img 1976 fuser module may be configured to combine item name/title, description, and image representations corresponding to specific items, for example. Additionally, the name_photo1_rand 1978 fuser module may be configured to combine an item name/title with an arbitrary photo, e.g., chosen at random or by user input, in some use cases. Such a photo may be a user-submitted image of an item to be listed for sale on an online marketplace platform, for example. Similarly, the name_desc_rand 1970 module may be a fuser module configured to combine an item name/title and an item description that may be arbitrarily selected or provided at random, in an embodiment.

Following this combination, name_desc_rand 1970 module may be a fuser module configured to combine names and descriptions, e.g., from separate featurizers models 1902 and 1905. Any vector or feature sets, including any numerical values derived from text and/or images, may serve as inputs to name_desc_rand 1976 and/or name_photo1_rand, for example. Moreover, output from any of name_photo1 rand 1978, name_desc_img 1976 or name_desc_rand 1970, alone or in combination (e.g., as a module for embedding representations), may be fed into one or more tasks, according to the enhanced techniques described herein.

The name desc_matching 1977 and name_photo1_matching 1979 elements represents a task configured to predict whether the item name (e.g., "name" from 1902 to 1970 and 1976), arbitrary description ("description_rand" from 1905 to 1970 and 1976), and/or arbitrary image from 1912 to 1976 and 1978) may correspond to the same item. Further, name_desc_img 1976 may correspond to brand class 1916, ner_full 1954, ner_seg 1958, price_reg 1960, L0_class 1962, L1_class 1964, and L2_class 1966. This task may be performed for purposes of tracking and improving accuracy or performance of the other tasks, according to some example embodiments.

Figure 20:
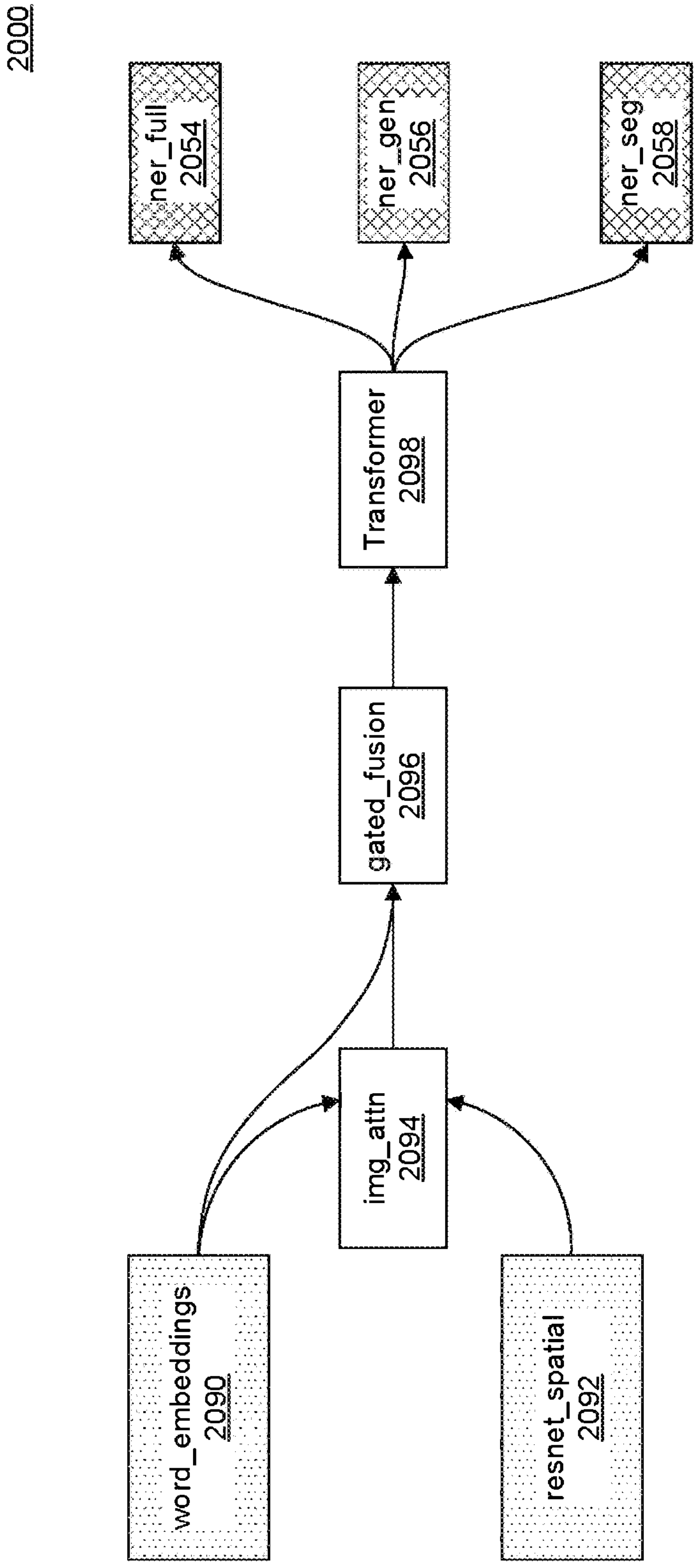
FIG. 20 depicts an example of multimodal-fusion named-entity recognition, according to some embodiments.

FIG. 20 depicts an example of multimodal-fusion named-entity recognition 2000, according to some embodiments.

In this configuration of NER 2000, the ner_full 2054 task may be carried out including input of image features (from resnet spatial 2092) as well as text features (from word_embeddings 2090), for some use cases. The word_embeddings 2090 module may be a featurizer module configured to use word embeddings to process item text, e.g., per algorithms such as word2vec, fastText, GloVe, or various other natural-language processing (NLP) techniques, for example.

A spatial ResNet such as resnet spatial 2092 may be a featurizer module configured to extract spatial image features from images of corresponding items, such as items to be listed for sale, among other possible uses for images of items (e.g., inventory, cataloguing, information retrieval, etc.), in some embodiments. Spatial image features may be regarded as different from those of other ResNet modules, e.g., resnet 1912 or 1212 as described above, in that spatial features may be two-dimensional representations (e.g., multidimensional arrays, matrices, tensors, etc.) instead of one-dimensional vectors, for example.

The img_attn module may be a fuser module configure to apply an "attention" algorithm that may correlate spatial features with words to in order to fuse them. The gated fusion 2096 module may be a fuser module configured to apply a "gated fusion" algorithm that may filter and combine various input features. The Transformer 2098 module may also be configured as a fuser module to use "Transformer" architecture to process a sequence of features (sequence of words) and to generate intermediate representations based at least in part thereon. Further, the transformer may correspond to the ner_full 2054, ner_gen 2056, and ner_seg 2058.

As described above with respect to FIGS. 18 and 19, among other examples, fuser modules may be connected in parallel for some ML flows. As shown in the configuration of NER 2000, the fuser modules may be connected in series (e.g., gated_fusion 2096 to Transformer 2098) or in a combination of series and parallel connections among multiple fuser modules (e.g., img_attn 2094 and gated_fusion 2096 with respect to word_embeddings 2090), in some use cases.

Figure 22:
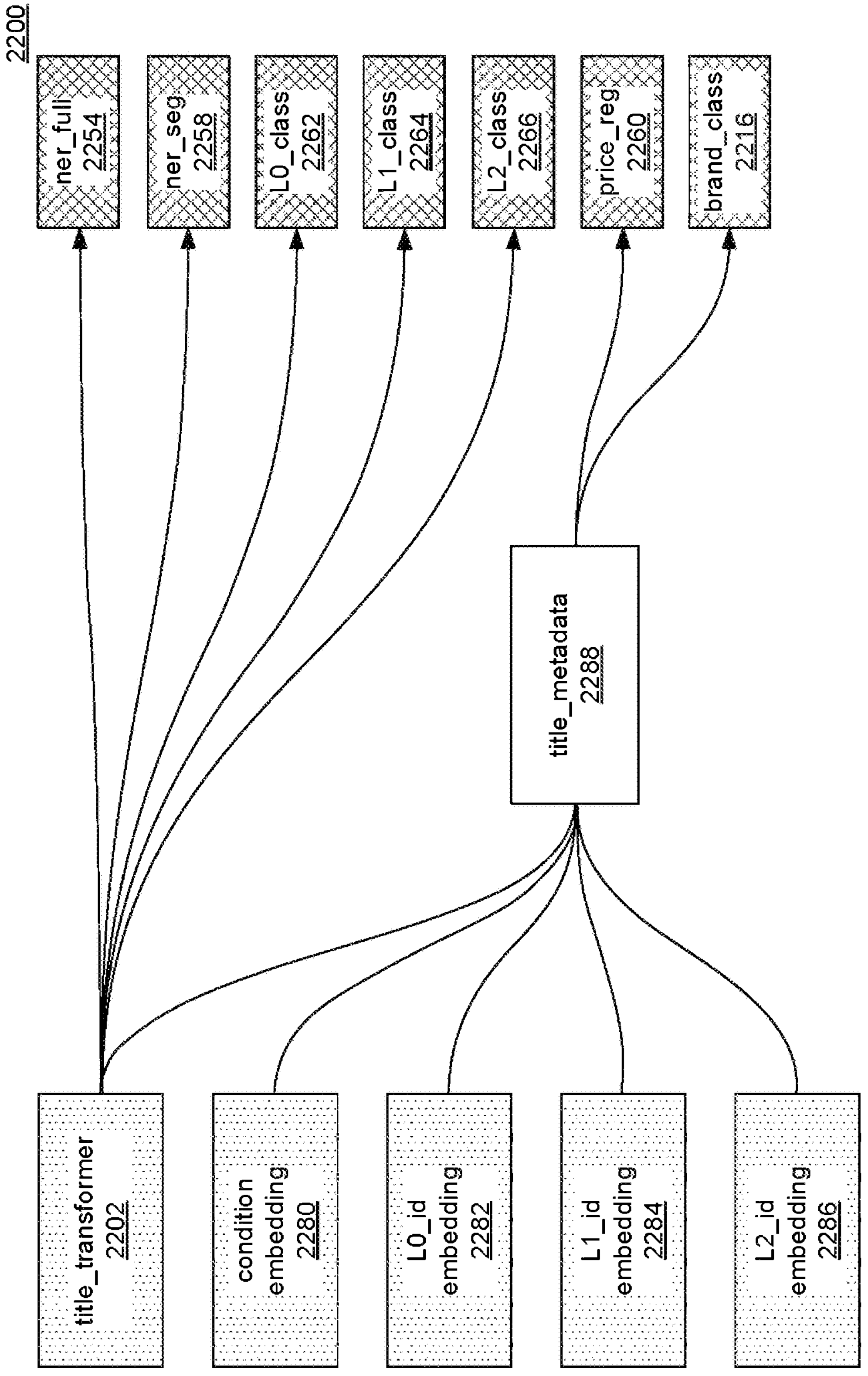
FIG. 22 depicts an example of multimodal named-entity recognition using text and metadata, according to some embodiments.

FIG. 22 depicts an example of multimodal named-entity recognition 2200 using text and metadata, according to some embodiments.

Intermediate representations of items may be constructed by title_transformer 2202 (featurizer) and title_metadata 2288 (fuser) module outputs. This configuration may facilitate switching between including and excluding item metadata values for classification and/or search, for some example use cases.

The condition embedding 2280 module represents a featurizer of learned embeddings based at least in part on a rating of an item's condition (e.g., new, like new, used-good, used-fair, etc.). The L0_id_embedding 2282, L1_id_embedding 2284, and L2_id_embedding 2286 may also represent featurizers of learned embeddings for various category identifiers. Categories and category identifiers, such as in terms of category classification, are described elsewhere herein. Corresponding classifiers include tasks such as L0_class 2262, L1_class 2264, L2_class 2266, and other tasks, such as brand_class 2216, price_reg 2260, ner_full 2254, and ner_seg 2258, as shown, corresponding to other elements of similarly-ending reference symbols used herein.

The title_metadata 2288 module represents a fuser module configured to combine metadata embeddings such as those produced by elements 2280-2286, for example. Metadata attributes (e.g., categories at any of various levels in a categorical hierarchy) may be used as both inputs (features) and outputs (tasks) for the a metadata-based fuser, according to some embodiments, provided that the same specific attribute is not both the input and output for a given ML flow, in some example use cases.

For example, it is beneficial for this configuration 2200 to avoid providing L1_id_embedding 2284 as an input to the L1_class 2266 task, because providing such input features to the corresponding output task may be regarded as analogous to embedding the answer to a question in the question itself, thus likely interfering with ML yielding meaningful representations for purposes of ontology and matching, in some embodiments. Accordingly, additional fusers (not shown) may be added, to separate certain featurizers from certain tasks.

Figure 21:
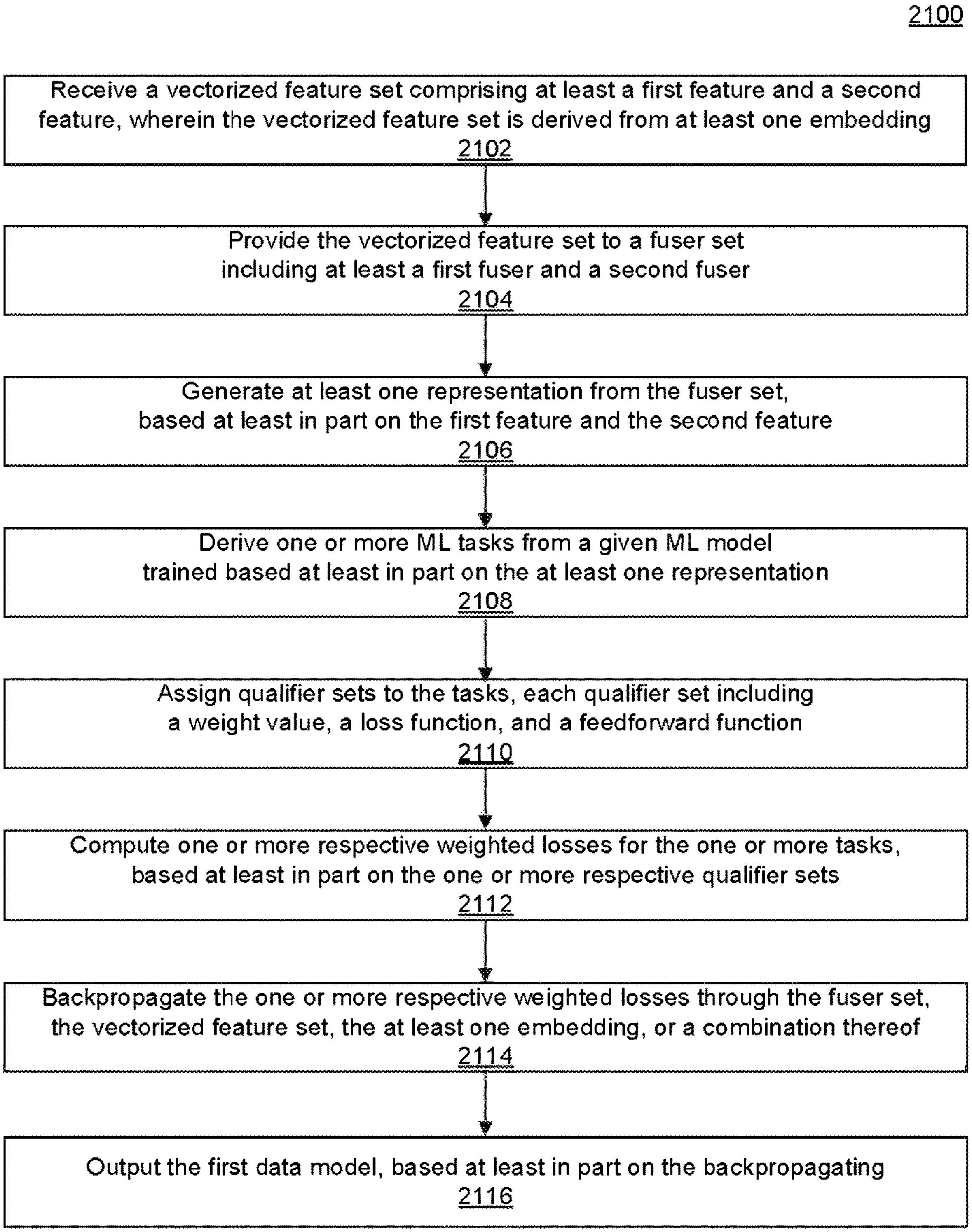
FIG. 21 is a flowchart illustrating a method including operations for use in automatic ontology generation by embedding representations, according to some embodiments.

FIG. 21 is a flowchart illustrating a method 2100 including machine-learning prediction or suggestion based on object identification, according to some embodiments. Method 2100 may be performed by processing logic that may comprise hardware (e.g., circuitry, dedicated logic, programmable logic, microcode, etc.), software (e.g., instructions executing on a processing device), or a combination thereof. Not all steps of method 2100 may be needed in all cases to perform the enhanced techniques disclosed herein. Further, some steps of method 2100 may be performed simultaneously, or in a different order from that shown in FIG. 21, as will be understood by a person of ordinary skill in the art.

Method 2100 shall be described with reference to FIGS. 21 and 23. However, method 2100 is not limited only to those example embodiments. The steps of method 2100 may be performed by at least one computer processor coupled to at least one memory device. An exemplary processor and memory device(s) are described below with respect to 2304 of FIG. 23. In some embodiments, method 2100 may be performed using system 2300 of FIG. 23, which may further include at least one processor and memory such as those of FIG. 23.

In 2102, at least one processor, such as processor 2304, may receive a vectorized feature set that includes at least a first feature and a second feature. The vectorized feature set is derived from at least one embedding, such as a word embedding or text embedding, as may be derived from a listing of words or a corpus of text via statistical processing and/or various related algorithms. Additionally, or alternatively, the at least one embedding may include other vectorized features extracted from other objects or data sets, e.g., an image or set of images, for example.

In some use cases, data input may be received from a user, a database hosted by system 2300 or an external system, which may be hosted by a third party. Data input may be received actively or passively, and may be provided via at least one interface, such as a user interface (UI) or application programming interface (API), among other equivalent mechanisms to enable data input and receiving of a vectorized feature set that may be derived from such data input.

The data input may be processed using one or more featurizers, which may accept raw data input in any of various forms, depending on a given featurizer and/or any accompanying pre-processing logic. The one or more featurizers may output numerical values in various dimensions. In some use cases, featurizers may produce numerical output in the form of vectors, which may correspond to vectorized features. Further examples of featurizers may include, but are not limited to, hardware or software devices or modules that may be configured to process input data for suitability with a model, such as a regression model, Transformer, or equivalent encoder, to name a few non-limiting examples. Data inputs or certain outputs may be adjusted based on various predetermined and/or dynamic factors that may be adjusted empirically to improve any aspect of the inputs, outputs, features, representations, models, other components, or any combination of the above.

The embedding, any component vector representations therein, and/or any vectorized features or feature sets extracted therefrom, may be regarded as trainable, semantic encodings that may be used for various machine learning (ML) tasks, for example. According to some embodiments, text data may be analyzed for word embedding, which may use, term frequency-inverse document frequency (tf-idf), a bag-of-words model, word2vec, or any other type of analytics, statistical analysis, weighting, classification, natural-language processing (NLP), equivalent transformations or representations, or any combination of the above, to list a few examples.

Other various types of data may be processed additionally using various other types of data encodings or intermediate representations. For example, any other processing, encodings, and/or intermediate representations may include various types of coding or encoding, such as label encoding or one-hot encoding, among other similar processing for tagging or embedding, or any combination of the above. Equivalent processing of categorical data for ML is also within the scope of the enhanced techniques disclosed herein.

In 2104, processor 2304 may provide the vectorized feature set to a fuser set comprising at least a first fuser and a second fuser. Aside from combining vectorized data in accordance with existing data-fusion methods, a fuser in the fuser set, such as the first fuser or the second fuser, among others, may also be configurable to define how to combine multi-modal features. Multi-modal feature combination may, for example, allow for fusing of vectorized features derived from word embeddings and from image data, for example, up to any number of supported types of data from which the at least one embedding referenced in 2102 may be derived.

As noted elsewhere herein, any of the fusers in the fuser set may be implemented in accordance with modular design, using software (including code stored in a non-transitory computer-readable storage medium), hardware (including programmable or reprogrammable circuitry), or a combination thereof. Additionally, or alternatively, any fuser, or the fuser set, may be implemented as logic embedded in other components, devices, or systems, for example.

In 2106, processor 2304 may generate at least one representation from the fuser set, based at least in part on the first feature and the second feature. According to some embodiments, any number of features may be used as a basis for generating a representation or any number of representations. Representations may be numerically expressed in any defined grouping, such as by tensors of various orders, e.g., scalars, vectors, matrices, etc.

A representation may correspond to an ontology, a frame, a semantic network or architecture, and/or a set of logical rules (e.g., first-order logic), any of which may be used in the course of computerized knowledge representation and reasoning, in various use cases. Any of the above representations or equivalents may be expressed via at least one notation in accordance with a suitable language, such as a constructed language, a knowledge representation language, an ontology language, or a combination thereof, for example.

Referring back to 2102, the embeddings from which vectorized feature sets are be derived may be one type of representation in themselves, e.g., vector representation. However, for 2106, representations generated from a fuser set have undergone additional processing, e.g., extracting a vectorized feature set from the embeddings, and then having various features combined via the fuser set.

In this way, the representations generated from the fuser set, which may include multiple fusers, may thus facilitate multi-modal data fusion and ML training. Here, multi-modal refers to having a basis in different inputs or different input types, such as text and images, text and metadata, or various other types of data as input for featurizers or which may otherwise correspond to or affect resultant feature sets from such featurizers.

Additionally, the fuser set, which may include multiple fusers, as noted above, may also thus facilitate multi-task outputs. Here multi-task refers to supporting multiple types of outputs, or having outputs produced via various other types of ML tasks, for example. Whereas conventional ML training involves training one ML model or Transformer to learn one corresponding task at any given time, the enhanced techniques used herein may be leveraged to train the same ML model or Transformer on multiple tasks simultaneously, thus improving overall training time, as well as machine performance and throughput for computers performing ML training.

Additionally, or alternatively, the enhanced techniques described herein may also leverage multiple fusers for a given fuser set, which may yield further performance benefits. For example, use of multiple fusers may allow for multiple inputs or input types (e.g., from one or more featurizers) to be used for a single output (e.g., training one ML model based on multiple types of input), multiple ML models or Transformers to be trained simultaneously based on at least one input (e.g., from one or more featurizers), or a combination thereof. FIG. 12 serves to illustrate one non-limiting example use case in this regard.

Thus, the correspondence of inputs or input types to outputs or output types may be one-to-many, many-to-one, or many-to-many. In some use cases, this correspondence may be enabled or improved as a result of using a fuser set including multiple fusers, for example. More specifically, the configurations described herein allow use of multiple (e.g., any arbitrary number) of fusers in series, in parallel, or in any combination of arrangements relative to each other.

Conventional technology allows at most only one fuser, which may cause undesirable effects of input features being processed into output tasks, as noted above with respect to configuration 2200 (FIG. 22). A conventional workaround is to have many separate ML flows in isolation, which also degrades accuracy and quality of outputs.

The enhanced techniques of embedding representations as described herein not only solves this problem as noted above, but also presents other benefits to enhance quality of outputs. For example, in addition to accommodating diverse feature sets based on multiple types of input data, the multiple featurizers supported by embedding representations as described herein allows for multiple tasks or auxiliary tasks, to facilitate better ML representations for learning, even if inputs of some tasks are inconsequential or otherwise problematic for other tasks. Other advantages to performance and efficiency thus also result from the enhanced techniques disclosed herein.

In 2108, processor 2304 may derive one or more ML tasks from a given ML model trained based at least in part on the at least one representation generated from the fuser set. As noted above with respect to 2106, in some embodiments, the at least one representation generated from the fuser set may be generated based at least in part on the first feature, the second feature, or any number of features, for example.

According to some embodiments, derivation of the one or more ML tasks per 2108 may include training. In some use cases, by this operation at 2108, a given ML model or Transformer may have been already trained with respect to some or all of the one or more ML tasks pertinent to the at least one representation generated from the fuser set. In such cases, further ML training may not be required—rather, pertinent tasks may be selected via predetermined logic paths, for example. The ML tasks derived may be used for backpropagation to create or update a data model as described further below with respect to 2114.

In 2110, processor 2304 may assign one or more respective qualifier sets to the one or more tasks, wherein each qualifier set of the one or more respective qualifier sets may include a weight value, a loss function, a feedforward function, a combination thereof, or may further include other elements, for any one or all of the one or more respective qualifier sets assigned to the one or more tasks, according to some use cases. Using at least one element of a given qualifier set, processor 2304 may compute various values corresponding to the given qualifier set, e.g., one or more weighted losses, which may in turn be used for backpropagation to create or update a data model as described further below with respect to 2114.

In 2112, processor 2304 may compute one or more respective weighted losses for the one or more tasks, based at least in part on the one or more respective qualifier sets, in some embodiments. For example, the weighted losses may be computed using any of various neural networks, deep learning, or other ML-related algorithms, to determine relevant values, e.g., weighted losses, with respect to a function, e.g., loss function, and any weights that may correspond to inputs or representation as noted above. Weights may be applied in different ways to multiple input values or intermediate values, such as via tensor arithmetic on class weights, etc., for a given representation, according to some use cases.

In 2114, processor 2304 may create or update a first data model, based at least in part on backpropagating the one or more respective weighted losses through the fuser set, the vectorized feature set, the at least one embedding, or a combination thereof. Backpropagation may be performed, for example, via at least one feedforward network, such as using any corresponding feedforward function from a given qualifier set, in some embodiments. According to some use cases, the backpropagating may encompass aspects of the deep learning or other ML-relate algorithms as described above with respect to 2112, for example.

In 2116, processor 2304 may output the first data model. Output of data models and other informational objects may be provided via at least one interface and/or protocol, UI, API, etc., such as via message passing, shared memory, network transmission, multicast or broadcast publication, etc., among other equivalent mechanisms to enable data output or similar communication.

In some embodiments, additionally or alternatively, the selected object may be selected via a selection performed automatically by at least one processor 2304, e.g., using predetermined information, programmed logic, neural networks, machine learning, or other tools such as may relate to artificial intelligence, in some cases. Automatic selection may further be subject to manual confirmation by a user, in some implementations.

To improve reliability, accuracy, reproducibility, etc., of computed value sets, multiple dimensions of characteristic data (identifiers) and/or layers of neural networks may be included or utilized in ML-based computation, which may be applied in various operations as described above. In some embodiments, supervised or unsupervised learning, based on manually curated or automatically generated data sets (or a combination thereof), may be used as training for a given model or algorithm to be performed with ML-based computation.

In some use cases, the ML-based workflow described with respect to method 2100 may be used to generate predictions, classification, or recognition of a given item with respect to a model, ontology, or other representation, for example. Such use cases may further make user of named-entity recognition (NER) tagging, according to some embodiments. Additionally, or alternatively, a prediction may be generated by querying a data model.

Moreover, an additional data model may be consumed or queried in order to generate a subsequent prediction. Such predictions may be generated, for example, based at least in part on any of the feedforward functions that may be present in a corresponding qualifier set, depending on a given use case. Other practical benefits resulting from such configurations of the enhanced techniques disclosed herein include more detailed classifications, e.g., necklines, sleeve lengths, etc., based at least in part on image featurization; more accurate price predictions; item similarity scoring in addition to or instead of item matching; query matching alongside or as an alternative to item matching, e.g., to provide relevance scoring; and other advantages and efficiencies that will be appreciated by ordinarily skilled artisans.

Method 2100 is disclosed in the order shown above in this example embodiment of FIG. 21. In practice, however, the operations disclosed above, alongside other operations, may be executed sequentially in any order, or they may alternatively be executed concurrently, with more than one operation being performed simultaneously, or any combination of the above.

Example Computer System

Figure 23:
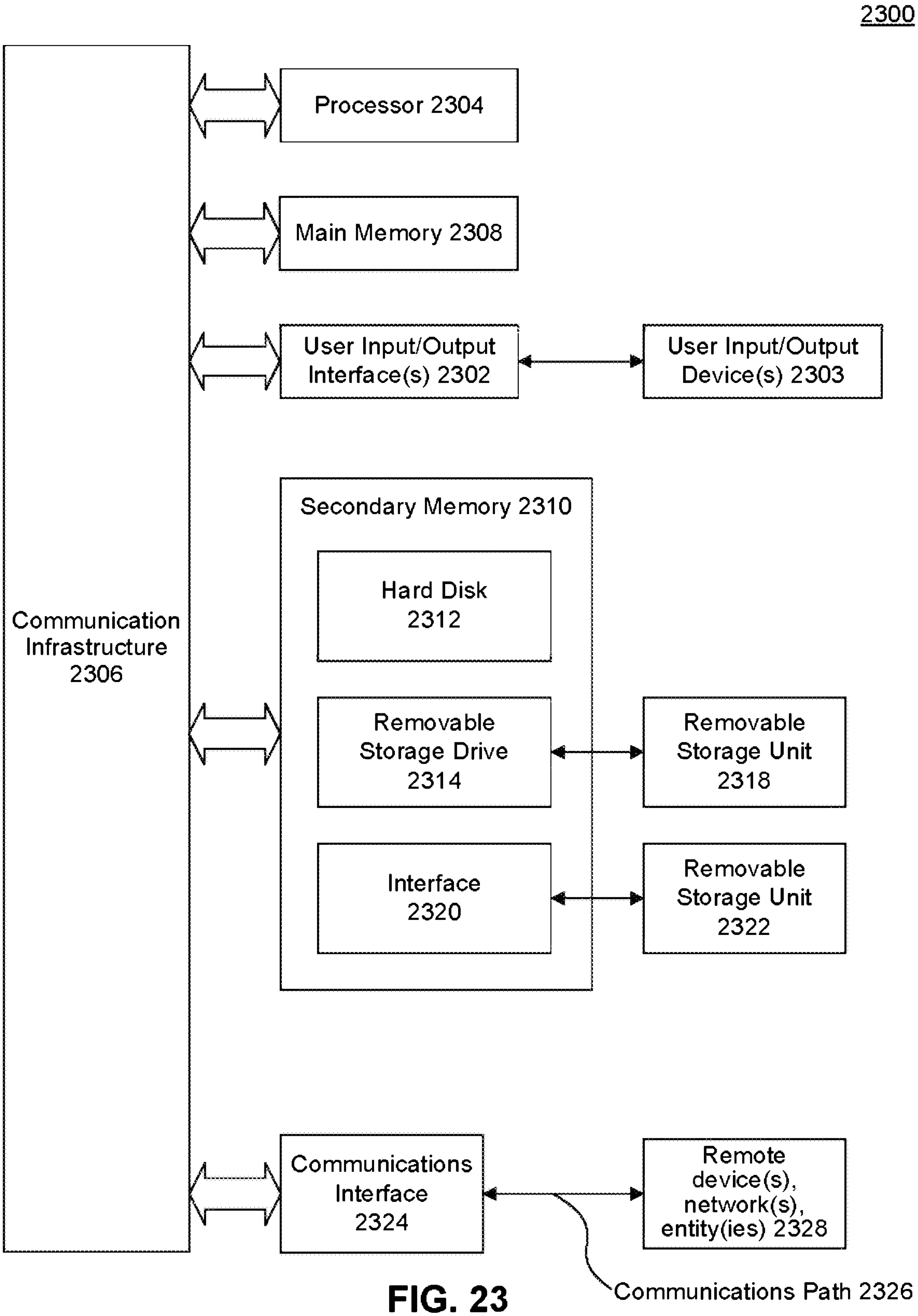
FIG. 23 illustrates a block diagram of a general purpose computer that may be used to perform various aspects of the present disclosure.

Various embodiments may be implemented, for example, using one or more computer systems, such as computer system 2300 shown in FIG. 23. One or more computer systems 2300 may be used, for example, to implement any of the embodiments discussed herein, as well as combinations and sub-combinations thereof.

Computer system 2300 may include one or more processors (also called central processing units, or CPUs), such as a processor 2304. Processor 2304 may be connected to a bus or communication infrastructure 2306.

Computer system 2300 may also include user input/output device(s) 2303, such as monitors, keyboards, pointing devices, etc., which may communicate with communication infrastructure 2306 through user input/output interface(s) 2302.

One or more of processors 2304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image-recognition and machine-learning aspects described herein.

Additionally, one or more of processors 2304 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 2300 may also include a main or primary memory 2308, such as random access memory (RAM). Main memory 2308 may include one or more levels of cache. Main memory 2308 may have stored therein control logic (i.e., computer software) and/or data.

Computer system 2300 may also include one or more secondary storage devices or secondary memory 2310. Secondary memory 2310 may include, for example, a main storage drive 2312 and/or a removable storage device or drive 2314. Main storage drive 2312 may be a hard disk drive or solid-state drive, for example. Removable storage drive 2314 may be a floppy disk drive, a magnetic tape drive, a compact disk drive, an optical storage device, tape backup device, and/or any other storage device/drive.

Removable storage drive 2314 may interact with a removable storage unit 2318. Removable storage unit 2318 may include a computer usable or readable storage device having stored thereon computer software (control logic) and/or data. Removable storage unit 2318 may be a floppy disk, magnetic tape, compact disk, DVD, optical storage disk, and/or any other computer data storage device. Removable storage drive 2314 may read from and/or write to removable storage unit 2318.

Secondary memory 2310 may include other means, devices, components, instrumentalities or other approaches for allowing computer programs and/or other instructions and/or data to be accessed by computer system 2300. Such means, devices, components, instrumentalities or other approaches may include, for example, a removable storage unit 2322 and an interface 2320. Examples of the removable storage unit 2322 and the interface 2320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2300 may further include a communication or network interface 2324. Communication interface 2324 may enable computer system 2300 to communicate and interact with any combination of external devices, external networks, external entities, etc. (individually and collectively referenced by reference number 2328). For example, communication interface 2324 may allow computer system 2300 to communicate with external or remote devices 2328 over communication path 2326, which may be wired and/or wireless (or a combination thereof), and which may include any combination of LANs, WANs, the Internet, etc. Control logic and/or data may be transmitted to and from computer system 2300 via communication path 2326.

Computer system 2300 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 2300 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 2300, main memory 2308, secondary memory 2310, and removable storage units 2318 and 2322, as well as tangible articles of manufacture embodying any combination of the foregoing. Such control logic, when executed by one or more data processing devices (such as computer system 2300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 23. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method of data modeling by backpropagation, the computer-implemented method comprising:

receiving, via at least one computer processor, a vectorized feature set comprising at least a first feature and a different second feature, wherein the vectorized feature set is derived from at least two different types of embeddings;

providing, via the at least one computer processor, the vectorized feature set to a fuser set comprising at least a first fuser and a second fuser, wherein the fuser set is configured to combine the at least two different types of the embeddings of the vectorized feature set;

generating, via the at least one computer processor, at least one combined representation from the fuser set, based at least in part on the first feature and the different second feature;

deriving, via the at least one computer processor, a set of machine learning (ML) tasks from training a given ML model based at least in part on the at least one combined representation, wherein the training the given ML model is based on configuring at least the first fuser and the second fuser in a pre-defined arrangement;

assigning automatically, via the at least one computer processor, one or more respective qualifier sets to the set of ML tasks, wherein each qualifier set of the one or more respective qualifier sets comprises a weight value, a loss function, and a feedforward function;

computing, via the at least one computer processor, one or more respective weighted losses for the set of ML tasks, based at least in part on the one or more respective qualifier sets; and outputting, via the at least one computer processor, a first data model, based at least in part on backpropagating, via the at least one computer processor, the one or more respective weighted losses through the fuser set, the vectorized feature set, or a combination thereof.

2. The computer-implemented method of claim 1, wherein the computing further comprises generating, via the at least one computer processor, a prediction based at least in part on the feedforward function of the one or more respective qualifier sets assigned to the set of ML tasks, using the at least one combined representation as input for the feedforward function.

3. The computer-implemented method of claim 1, wherein the set of ML tasks comprises a named-entity recognition (NER) tagger and an ML classifier.

4. The computer-implemented method of claim 1, further comprising performing multi-modal training, via the at least one computer processor, based at least in part on the at least one combined representation, wherein the at least one combined representation is derived from fusing, via the fuser set, the at least two different types of embeddings comprising image data, metadata, and text embeddings.

5. The computer-implemented method of claim 1, further comprising performing multi-task training, via the at least one computer processor, based at least in part on the at least one combined representation, wherein an output of the multi-task training comprises multiple task types.

6. The computer-implemented method of claim 2, further comprising querying, via the at least one computer processor, the first data model to generate a first subsequent prediction.

7. The computer-implemented method of claim 2, wherein the at least one combined representation is consumed by a second data model to generate a second subsequent prediction.

8. A non-transitory computer-readable storage medium storing instructions that, when executed by at least one computer processor, cause the at least one computer processor to perform operations for data modeling by backpropagation, the operations comprising:

receiving a vectorized feature set comprising at least a first feature and a different second feature, wherein the vectorized feature set is derived from at least two different types of embeddings;

providing the vectorized feature set to a fuser set comprising at least a first fuser and a second fuser, wherein the fuser set is configured to combine the at least two different types of the embeddings of the vectorized feature set;

generating at least one combined representation from the fuser set, based at least in part on the first feature and the different second feature;

deriving a set of machine learning (ML) tasks from training a given ML model based at least in part on the at least one combined representation, wherein the training the given ML model is based on configuring at least the first fuser and the second fuser in a pre-defined arrangement;

assigning automatically one or more respective qualifier sets to the set of ML tasks, wherein each qualifier set of the one or more respective qualifier sets comprises a weight value, a loss function, and a feedforward function;

computing one or more respective weighted losses for the set of ML tasks, based at least in part on the one or more respective qualifier sets; and outputting a first data model, based at least in part on backpropagating the one or more respective weighted losses through the fuser set, the vectorized feature set, or a combination thereof.

9. The non-transitory computer-readable storage medium of claim 8, wherein the computing further comprises generating, via the at least one computer processor, a prediction based at least in part on the feedforward function of the one or more respective qualifier sets assigned to the set of ML tasks, using the at least one combined representation as input for the feedforward function.

10. The non-transitory computer-readable storage medium of claim 9, wherein the one or more respective weighted losses are calculated, via the at least one computer processor, based at least in part on the loss function of the one or more respective qualifier sets, using the prediction as input for the loss function.

11. The non-transitory computer-readable storage medium of claim 8, the operations further comprising performing multi-modal training, via the at least one computer processor, based at least in part on the at least one combined representation, wherein the at least one combined representation is derived from fusing, via the fuser set, the at least two different types of embeddings comprising image data, metadata, and text embeddings.

12. The non-transitory computer-readable storage medium of claim 8, the operations further comprising performing multi-task training, via the at least one computer processor, based at least in part on the at least one combined representation, wherein an output of the multi-task training comprises multiple task types.

13. The non-transitory computer-readable storage medium of claim 9, the operations further comprising querying, via the at least one computer processor, the first data model to generate a first subsequent prediction, wherein the at least one combined representation is consumed by a second data model to generate a second subsequent prediction.

14. A system of data modeling by backpropagation, comprising:

a memory; and at least one computer processor coupled to the memory and configured to perform operations comprising:

receiving a vectorized feature set comprising at least a first feature and a different second feature, wherein the vectorized feature set is derived from at least two different types of embeddings;

providing the vectorized feature set to a fuser set comprising at least a first fuser and a second fuser, wherein the fuser set is configured to combine the at least two different types of the embeddings of the vectorized feature set;

generating at least one combined representation from the fuser set, based at least in part on the first feature and the different second feature;

deriving a set of machine learning (ML) tasks from training a given ML model based at least in part on the at least one combined representation, wherein the training the given ML model is based on configuring at least the first fuser and the second fuser in a pre-defined arrangement;

assigning automatically one or more respective qualifier sets to the set of ML tasks, wherein each qualifier set of the one or more respective qualifier sets comprises a weight value, a loss function, and a feedforward function;

computing one or more respective weighted losses for the set of ML tasks, based at least in part on the one or more respective qualifier sets; and outputting a first data model, based at least in part on backpropagating the one or more respective weighted losses through the fuser set, the vectorized feature set, or a combination thereof.

15. The system of claim 14, wherein the computing further comprises generating, via the at least one computer processor, a prediction based at least in part on the feedforward function of the one or more respective qualifier sets assigned to the set of ML tasks, using the at least one combined representation as input for the feedforward function.

16. The system of claim 15, wherein the one or more respective weighted losses are calculated, via the at least one computer processor, based at least in part on the loss function of the one or more respective qualifier sets, using the prediction as input for the loss function.

17. The system of claim 14, the operations further comprising performing multi-modal training, via the at least one computer processor, based at least in part on the at least one combined representation, wherein the at least one combined representation is derived from fusing, via the fuser set, the at least two different types of embeddings comprising image data, metadata, and text embeddings.

18. The system of claim 14, the operations further comprising performing multi-task training, via the at least one computer processor, based at least in part on the at least one combined representation, wherein an output of the multi-task training comprises multiple task types.

19. The system of claim 15, the operations further comprising querying, via the at least one computer processor, the first data model to generate a first subsequent prediction, wherein the at least one combined representation is consumed by a second data model to generate a second subsequent prediction.

20. The computer-implemented method of claim 1, wherein the deriving further comprises configuring, via the at least one computer processor, at least the first fuser and the second fuser in a parallel arrangement.

* * * * *